United States Patent
Baghel et al.

(10) Patent No.: US 10,721,027 B2
(45) Date of Patent: Jul. 21, 2020

(54) RADIO VEHICLE-TO-ANYTHING NEGATIVE ACKNOWLEDGEMENT BASED MULTICAST

(71) Applicant: QUALCOMM Incorporated, San Diego, CA (US)

(72) Inventors: Sudhir Kumar Baghel, Hillsborough, NJ (US); Shailesh Patil, San Diego, CA (US); Zhibin Wu, Bedminster, NJ (US); Kapil Gulati, Dover, DE (US); Hong Cheng, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/020,518

(22) Filed: Jun. 27, 2018

(65) Prior Publication Data

US 2019/0036652 A1    Jan. 31, 2019

Related U.S. Application Data

(60) Provisional application No. 62/537,915, filed on Jul. 27, 2017.

(51) Int. Cl.
| | |
|---|---|
| *H04L 1/16* | (2006.01) |
| *H04L 1/18* | (2006.01) |
| *H04W 4/40* | (2018.01) |
| *H04L 5/00* | (2006.01) |
| *H04L 1/00* | (2006.01) |
| *H04L 27/00* | (2006.01) |

(52) U.S. Cl.
CPC .......... *H04L 1/1628* (2013.01); *H04L 1/1664* (2013.01); *H04L 1/1671* (2013.01);
(Continued)

(58) Field of Classification Search
CPC ... H04L 1/1628; H04L 5/0055; H04L 1/1664; H04L 1/1671; H04L 1/1896;
(Continued)

(56) References Cited

U.S. PATENT DOCUMENTS

| | | |
|---|---|---|
| 2005/0249231 A1 | 11/2005 | Khan |
| 2007/0263631 A1 | 11/2007 | Mallory |

(Continued)

FOREIGN PATENT DOCUMENTS

WO    WO-2017103662 A1    6/2017

OTHER PUBLICATIONS

Partial International Search Report—PCT/US2018/040999—ISA/EPO—dated Oct. 9, 2018.
(Continued)

*Primary Examiner* — Sharad Rampuria
(74) *Attorney, Agent, or Firm* — Holland & Hart LLP

(57) ABSTRACT

Methods, systems, and devices for wireless communication are described. One method for wireless communication at a first device includes receiving a multicast packet from a second device, decoding control header information in the received multicast packet, determining that a decoding procedure associated with a payload of the received multicast packet is unsuccessful and transmitting a negative acknowledgement (NACK) based at least in part on the determining. The method also includes retrieving a list of transmitter identifiers. In some cases, transmitting the NACK is based at least in part on the list of transmitter identifiers. The method further includes determining a transmitter identifier associated with the multicast packet and determining that the transmitter identifier is present in the list of transmitter identifiers.

52 Claims, 15 Drawing Sheets

(52) U.S. Cl.
CPC .......... *H04L 1/1864* (2013.01); *H04L 1/1896* (2013.01); *H04L 5/0055* (2013.01); *H04W 4/40* (2018.02); *H04L 1/1848* (2013.01); *H04L 5/001* (2013.01); *H04L 27/0006* (2013.01); *H04L 2001/0093* (2013.01)

(58) Field of Classification Search
CPC ... H04L 1/1864; H04L 27/0006; H04L 5/001; H04L 2001/0093; H04L 43/00; H04L 43/50; H04W 4/40; H04W 24/00; H04B 7/00; H04B 3/46; H04B 17/00
See application file for complete search history.

(56) References Cited

U.S. PATENT DOCUMENTS

| | | | | |
|---|---|---|---|---|
| 2008/0209297 | A1* | 8/2008 | Chandra | H04L 1/1838 714/748 |
| 2009/0086685 | A1* | 4/2009 | Aghili | H04L 1/1685 370/336 |
| 2010/0098006 | A1* | 4/2010 | Golitschek Edler Von Elbwart | H04L 1/1861 370/329 |
| 2012/0244847 | A1 | 9/2012 | Chandra et al. | |
| 2017/0055248 | A1* | 2/2017 | Moon | H04L 1/1812 |
| 2018/0092105 | A1* | 3/2018 | Lee | H04W 76/50 |
| 2018/0367261 | A1* | 12/2018 | Gonzalves Serrano | H04L 1/1854 |

OTHER PUBLICATIONS

International Search Report and Written Opinion—PCT/US2018/040999—ISA/EPO—dated Feb. 1, 2019.
Wang H., et al., "An Improved Data Transport Protocol for Underwater Acoustic Sensor Networks", OCEANS 2016 MTS/IEEE Monterey, IEEE, Sep. 19, 2016, XP033014598, DOI: 10.1109/0CEANS.2016.7761436 [retrieved on Nov. 28, 2016], pp. 1-5.

\* cited by examiner

RADIO VEHICLE-TO-ANYTHING NEGATIVE ACKNOWLEDGEMENT BASED MULTICAST

CROSS REFERENCES

The present Application for Patent claims the benefit of and priority to U.S. Provisional Patent Application No. 62/537,915 by Baghel, et al., entitled "NEW RADIO VEHICLE-TO-ANYTHING NEGATIVE ACKNOWLEDGEMENT BASED MULTICAST," filed Jul. 27, 2017, assigned to the assignee hereof, and which is expressly incorporated by reference herein.

INTRODUCTION

The following relates generally to wireless communication, and more specifically to New Radio (NR) Vehicle-to-Anything (V2X) Negative Acknowledgement (NACK) based multicast.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may include or support networks used for various communications, such as vehicle based communication systems also referred to as V2X communication systems. V2X communications systems may be used by vehicles to increase safety and to help prevent collisions of vehicles. V2X communication systems may be configured to convey important information to a driver regarding inclement weather, nearby accidents, road conditions, and/or the dangerous activities of nearby vehicles. V2X communication systems may also be used by autonomous vehicles (self-driving vehicles) and may provide extra information beyond the reach of the vehicle's existing system. In some cases, vehicles may communicate directly with each other using device-to-device (D2D) communications over a D2D wireless link. Some networks may enable or support various wireless communication, including vehicle related communication. There is a need, however, for more effective techniques for improving reliability of transmission in various communication situations, including V2X communication.

SUMMARY

A method of wireless communication at a first device is described. The method may include receiving a multicast packet from a second device, decoding control header information in the received multicast packet, determining that a decoding procedure associated with a payload of the received multicast packet is unsuccessful, and transmitting a NACK based on the determining.

An apparatus for wireless communication at a first device is described. The apparatus may include means for receiving a multicast packet from a second device, means for decoding control header information in the received multicast packet, means for determining that a decoding procedure associated with a payload of the received multicast packet is unsuccessful, and means for transmitting a NACK based on the determining.

Another apparatus for wireless communication at a first device is described. The apparatus may include a processor, memory in electronic communication with the processor, and instructions stored in the memory. The instructions may be operable to cause the processor to receive a multicast packet from a second device, decode control header information in the received multicast packet, determine that a decoding procedure associated with a payload of the received multicast packet is unsuccessful, and transmit a NACK based on the determining.

A non-transitory computer readable medium for wireless communication at a first device is described. The non-transitory computer-readable medium may include instructions operable to cause a processor to receive a multicast packet from a second device, decode control header information in the received multicast packet, determine that a decoding procedure associated with a payload of the received multicast packet is unsuccessful, and transmit a NACK based on the determining.

Some examples of the method, apparatus, and non-transitory computer-readable medium described above may further include processes, features, means, or instructions for retrieving a determined list of transmitter identifiers. In some cases, transmitting the NACK may be based on the determined list of transmitter identifiers.

Some examples of the method, apparatus, and non-transitory computer-readable medium described above may further include processes, features, means, or instructions for determining a transmitter identifier associated with the multicast packet. In some cases, determining the transmitter identifier may be based on the decoded control header information. Some examples of the method, apparatus, and non-transitory computer-readable medium described above may further include processes, features, means, or instructions for determining that the transmitter identifier may be present in the determined list of transmitter identifiers. In some cases, transmitting the NACK may be based on the transmitter identifier being present in the determined list of transmitter identifiers.

In some examples of the method, apparatus, and non-transitory computer-readable medium described above, the determined list of transmitter identifiers may be based on one or more transmitters located within a determined distance, a type of a sensor information, a combination of one or more types of sensor information, or a combination thereof.

Some examples of the method, apparatus, and non-transitory computer-readable medium described above may further include processes, features, means, or instructions for generating a sequence associated with the multicast packet. In some cases, the transmitted NACK comprises the sequence associated with the multicast packet.

Some examples of the method, apparatus, and non-transitory computer-readable medium described above may further include processes, features, means, or instructions for determining a sequence identifier based on a transmitter identifier. In some cases, generating the sequence associated with the multicast packet may be based on the sequence identifier.

Some examples of the method, apparatus, and non-transitory computer-readable medium described above may further include processes, features, means, or instructions for identifying time and frequency resources associated with transmission of the multicast packet. Some examples of the method, apparatus, and non-transitory computer-readable medium described above may further include processes, features, means, or instructions for determining a sequence identifier based on the time and frequency resources. In some cases, generating the sequence associated with the multicast packet may be based on the sequence identifier.

Some examples of the method, apparatus, and non-transitory computer-readable medium described above may further include processes, features, means, or instructions for determining at least one resource block associated with the multicast packet. Some examples of the method, apparatus, and non-transitory computer-readable medium described above may further include processes, features, means, or instructions for identifying an energy level associated with the at least one resource block. In some cases, identifying the time and frequency resources based on the energy level.

Some examples of the method, apparatus, and non-transitory computer-readable medium described above may further include processes, features, means, or instructions for timing and frequency resources associated with the sequence may be same as the time and frequency resources associated with transmission of the multicast packet.

Some examples of the method, apparatus, and non-transitory computer-readable medium described above may further include processes, features, means, or instructions for timing and frequency resources associated with the sequence may be derived randomly.

In some examples of the method, apparatus, and non-transitory computer-readable medium described above, a length of the sequence may be based on a length of a transmission associated with the multicast packet.

In some examples of the method, apparatus, and non-transitory computer-readable medium described above, a length of the sequence may be preconfigured.

Some examples of the method, apparatus, and non-transitory computer-readable medium described above may further include processes, features, means, or instructions for identifying a symbol occurring after one or more transmission time intervals (TTIs). In some cases, transmitting the NACK occurs on the identified symbol.

In some examples of the method, apparatus, and non-transitory computer-readable medium described above, the identified symbol may be a last symbol of a TTI. In some cases, transmitting the NACK occurs on the last symbol of the TTI.

In some examples of the method, apparatus, and non-transitory computer-readable medium described above, the identified symbol may be a gap symbol after a determined number of TTIs. In some cases, transmitting the NACK occurs on the gap symbol after the determined number of TTIs.

In some examples of the method, apparatus, and non-transitory computer-readable medium described above, the identified symbol may be a gap symbol of a TTI within a determined period. In some cases, transmitting the NACK occurs on the gap symbol of the TTI within the determined period.

In some examples of the method, apparatus, and non-transitory computer-readable medium described above, the first device, or the second device, or both include a stationary vehicle, a vehicle in motion, a UE, a motion sensor, a camera sensor, a light detection and ranging (LIDAR) sensor, a radio detection and ranging (RADAR) sensor, or any combination thereof.

A method of wireless communication at a first device is described. The method may include transmitting a multicast packet to one or more devices, receiving a NACK, the NACK including a sequence identifier indicating that a decoding procedure associated with a payload of the multicast packet is unsuccessful, and retransmitting the multicast packet to the one or more devices based on the NACK.

An apparatus for wireless communication at a first device is described. The apparatus may include means for transmitting a multicast packet to one or more devices, means for receiving a NACK, the NACK including a sequence identifier indicating that a decoding procedure associated with a payload of the multicast packet is unsuccessful, and means for retransmitting the multicast packet to the one or more devices based on the NACK.

Another apparatus for wireless communication at a first device is described. The apparatus may include a processor, memory in electronic communication with the processor, and instructions stored in the memory. The instructions may be operable to cause the processor to transmit a multicast packet to one or more devices, receive a NACK, the NACK including a sequence identifier indicating that a decoding procedure associated with a payload of the multicast packet is unsuccessful, and retransmit the multicast packet to the one or more devices based on the NACK.

A non-transitory computer readable medium for wireless communication at a first device is described. The non-transitory computer-readable medium may include instructions operable to cause a processor to transmit a multicast packet to one or more devices, receive a NACK, the NACK including a sequence identifier indicating that a decoding procedure associated with a payload of the multicast packet is unsuccessful, and retransmit the multicast packet to the one or more devices based on the NACK.

Some examples of the method, apparatus, and non-transitory computer-readable medium described above may further include processes, features, means, or instructions for determining a transmitter identifier associated with the multicast packet. Some examples of the method, apparatus, and non-transitory computer-readable medium described above may further include processes, features, means, or instructions for adding at least a portion of the transmitter identifier to control header information in the multicast packet prior to transmitting.

Some examples of the method, apparatus, and non-transitory computer-readable medium described above may further include processes, features, means, or instructions for determining the sequence identifier from the NACK. Some examples of the method, apparatus, and non-transitory computer-readable medium described above may further include processes, features, means, or instructions for comparing the sequence identifier with the transmitter identifier associated with the multicast packet. In some cases, retransmitting the multicast packet may be based on the comparing.

Some examples of the method, apparatus, and non-transitory computer-readable medium described above may further include processes, features, means, or instructions for determining time and frequency resources associated with transmission of the multicast packet. Some examples of the method, apparatus, and non-transitory computer-readable medium described above may further include processes, features, means, or instructions for determining the sequence identifier associated with the NACK. Some examples of the method, apparatus, and non-transitory computer-readable medium described above may further include processes, features, means, or instructions for determining time and frequency resources associated with the sequence identifier. In some cases, retransmitting the multicast packet may be based on the time and frequency resources associated with the sequence identifier and the time and frequency resources associated with transmission of the multicast packet.

Some examples of the method, apparatus, and non-transitory computer-readable medium described above may further include processes, features, means, or instructions for determining a first sequence associated with the NACK. In some cases, the NACK may be received from a first device. Some examples of the method, apparatus, and non-transitory computer-readable medium described above may further include processes, features, means, or instructions for receiving a second NACK from a second device different from the first device. Some examples of the method, apparatus, and non-transitory computer-readable medium described above may further include processes, features, means, or instructions for determining a second sequence associated with the second NACK, the first sequence and the second sequence being orthogonal to each other. In some cases, retransmitting the multicast packet may be based on the first sequence and the second sequence.

In some examples of the method, apparatus, and non-transitory computer-readable medium described above, the first device, or the second device, or both include a stationary vehicle, a vehicle in motion, a UE, a motion sensor, a camera sensor, a LIDAR sensor, a RADAR sensor, or any combination thereof.

Some examples of the method, apparatus, and non-transitory computer-readable medium described above may further include processes, features, means, or instructions for flushing a buffer associated with retransmitting the multicast packet at a time satisfying a threshold period after transmitting the multicast packet to the one or more devices. In some cases, the NACK may be received after the threshold period.

DETAILED DESCRIPTION

Figure 1:
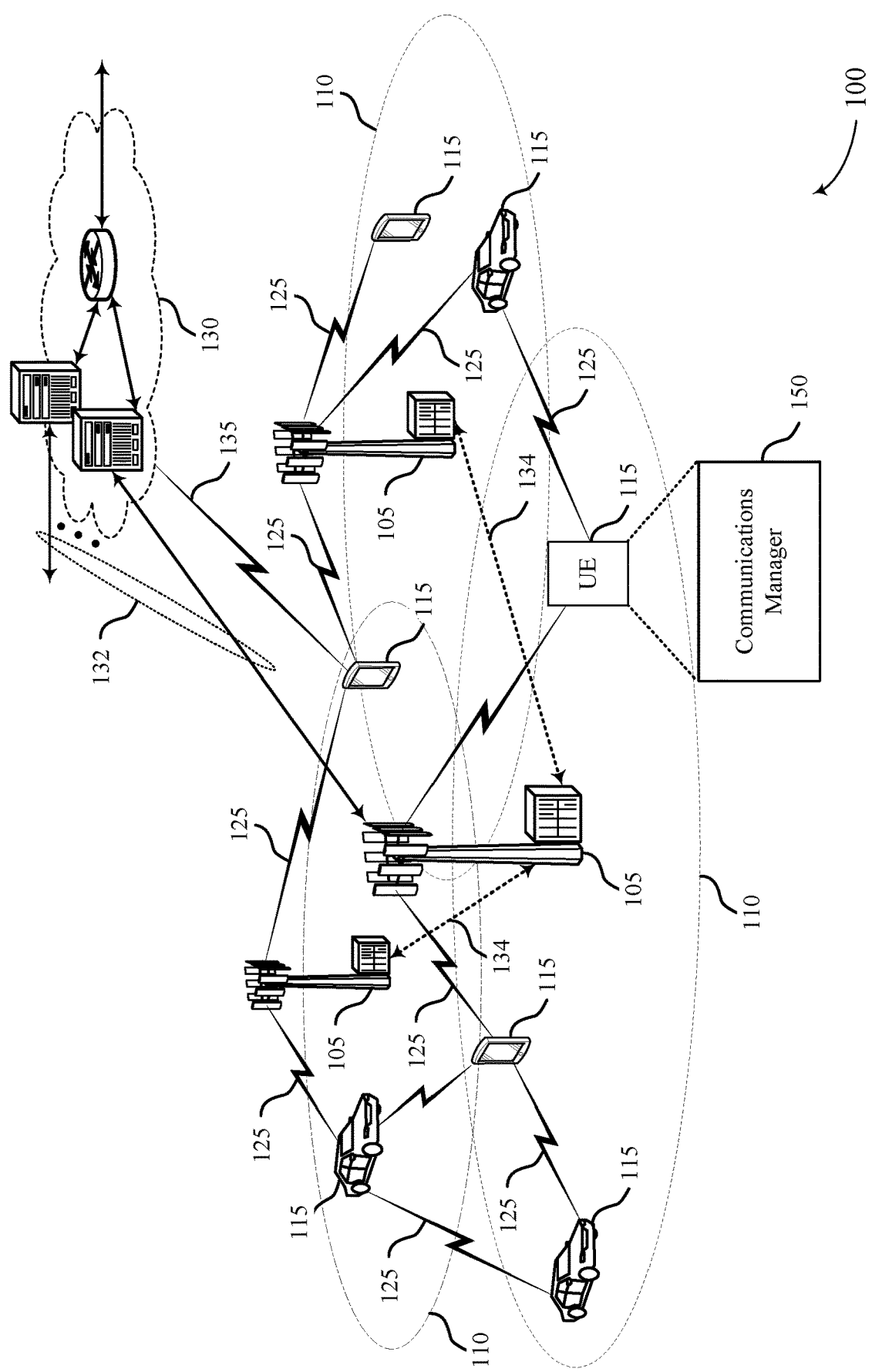
FIG. 1 illustrates an example of a system for wireless communication at a first device that supports NR V2X NACK based multicast in accordance with one or more aspects of the present disclosure.

Some wireless communications systems may be used to facilitate communications with various devices, which may include vehicles and these systems may sometimes be referred to as V2X communication systems. In some cases, such communication system may also be referred to as D2D communication system. Some V2X communication systems may operate in a millimeter wave (mmW) frequency spectrum band. In some cases, sensor information may be shared between vehicles. The mobility of devices such as vehicles or other devices including sensors in the V2X communication systems presents challenges to maintaining reliability of transmission between multiple devices. As devices move and change course in unpredictable ways, the topology of the communication system at any given location may be rapidly changing. Maintaining reliable communication links with neighboring entities in the communication system may be useful to enable V2X or other interactions.

For example, a sensor device in a communication system may broadcast information that it sensed (e.g., indicative of objects or conditions in the vicinity of the sensor). Nearby devices (e.g., vehicles, other devices) may receive the broadcast information and may thereby determine whether and how to take action based on the sensed objects or conditions. The use of vehicle-related networks and applications is expected to increase substantially and in some examples, vehicle-related communication uses multiple sensors, but current techniques do not provide the functionality necessary for desired communication and coordination.

Techniques are described that support methods and operations for NR V2X NACK based multicast. A V2X communication system may receive and transmit multiple NACKs to improve reliability of transmissions between one or more vehicles. A transmitter in a V2X system may transmit a packet. The packet may be broadcasted to other entities in the V2X system. A receiver may be configured to receive the multicast packet and may perform a decoding procedure. The decoding procedure may include decoding of control information (e.g., control header information) of the received multicast packet and decoding of data of the received multicast packet. The receiver of the multicast packet may, in some examples, successfully decode control information from the received multicast packet and fail to decode the data included in the received multicast packet. Upon successfully decoding the control header information and failing to decode the data included in a multicast packet, the receiver may, in some examples, transmit a notification or indication (e.g., a NACK) to the transmitter.

In some examples, the NACK may be transmitted as a sequence. As part of generating the sequence, the receiver of the multicast packet may determine a sequence identifier based on information from the received multicast packet. The receiver may further generate the sequence based on the sequence identifier. The receiver of the multicast packet may then transmit the NACK as part of the sequence. Upon receiving the NACK, the transmitter may, in some examples, retransmit the multicast packet, perform other operations, or both.

Aspects of the disclosure are initially described in the context of a wireless communications system. Aspects of the disclosure are illustrated by and described with reference to V2X communication system diagrams that relate to techniques for NACK based multicast in a V2X communication system. Aspects of the disclosure are further illustrated by and described with reference to apparatus diagrams, system diagrams, and flowcharts that relate to techniques for NR V2X NACK based multicast. Although some examples of the disclosure are described in the context of a V2X communication system, the concepts and the techniques described are not limited to these exemplary systems.

FIG. 1 illustrates an example of a wireless communications system 100 in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a LTE network, an LTE-A network, or a NR network. In some cases, wireless communications system 100 may support enhanced broadband communications, ultra-reliable (i.e., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same code word) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined (e.g., predetermined or preconfigured) bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (e.g., set of subcarriers or resource blocks) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

UEs 115 may include a communications manager 150, which may perform various operations in accordance with aspects of the present disclosure, including receiving a multicast packet from a second UE 115. The communications manager 150 may, in some examples, further decode control information (e.g., control header information) in the received multicast packet, attempt to decode a payload (e.g., data) in the received multicast packet, determine that a decoding procedure associated with a payload of the received multicast packet is unsuccessful, and transmit a NACK based on the determining.

Figure 2A:
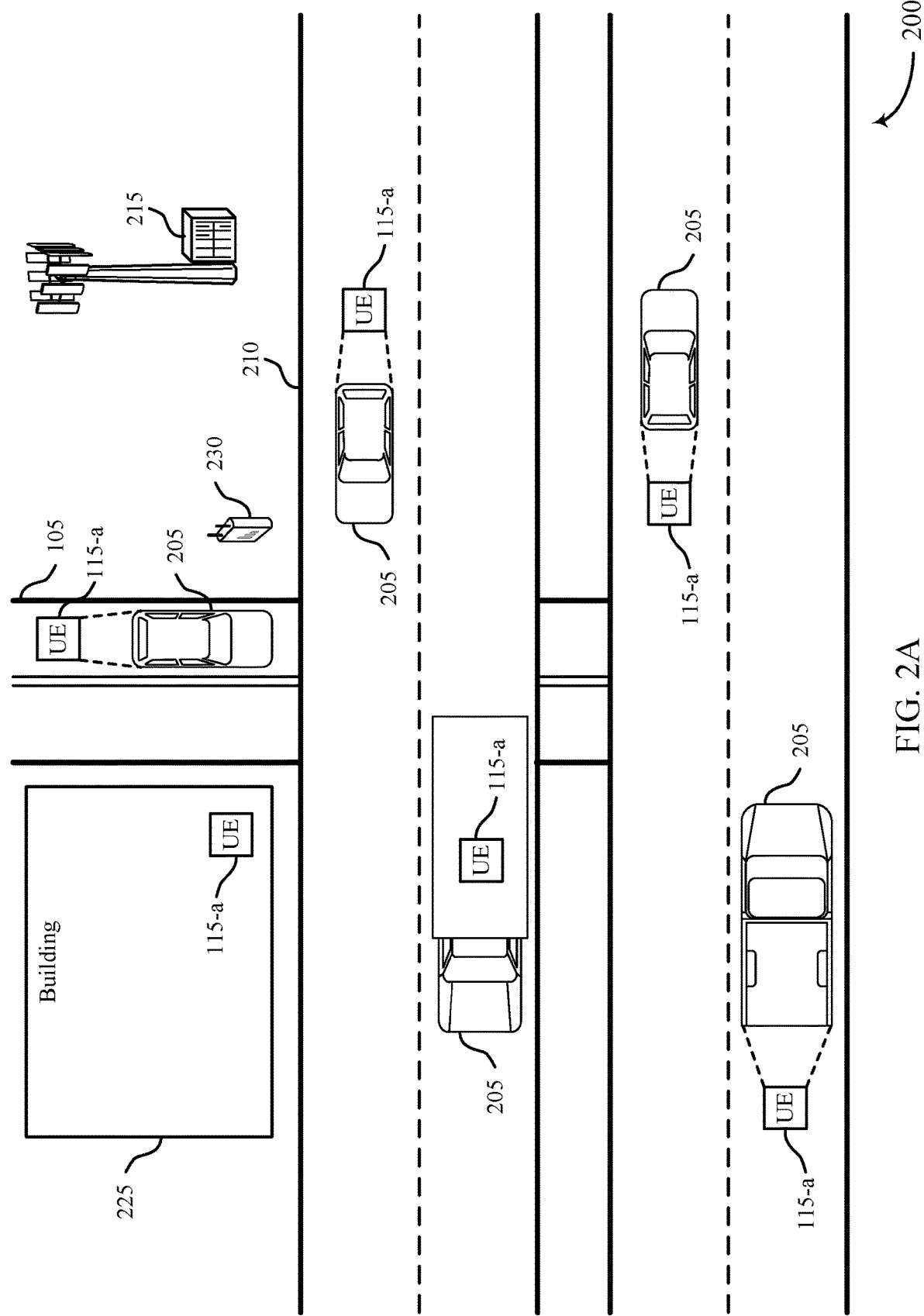
FIG. 2A illustrates an example of a V2X communication system that supports NR V2X NACK based multicast in accordance with one or more aspects of the present disclosure.

FIG. 2A illustrates an example of a V2X communication system 200 that supports NR V2X NACK based multicast in accordance with one or more aspects of the present disclosure. In some examples, the V2X communication system 200 may implement aspects of the wireless communications system 100.

The V2X communication system 200 (or D2D communication system 200) may be configured to communicate information between devices (e.g., vehicles 205) or to any device that may interact with a first device (e.g., vehicle 205). Such V2X communication systems 200 may be implemented along roads 210 and other transportation through ways. The V2X communication system 200 may incorporate aspects of other types of communication systems includes vehicle-to-infrastructure (V2I) communication systems, vehicle-to-vehicle (V2V) communication systems, vehicle-to-pedestrian (V2P) communication systems, vehicle-to-device (V2D) communication systems, vehicle-to-grid (V2G) communication systems, or a combination thereof.

The V2X communication system 200 may include a number of base stations 215 and UEs 115-a. The base stations 215 may be configured to coordinate other types of communications in the V2X communication system 200 and to provide an access point for UEs of the V2X communication system 200 to access outside networks (e.g., the Internet). The base station 215 may be an example of the base stations 105 described with reference to FIG. 1. The base stations 215 and the UEs 115-a may communicate using one or more communication links (not shown for clarity purposes). The communication links of the V2X communication system 200 may be examples of the communication links 125 described with reference to FIG. 1, among other examples.

The UEs 115-a of the V2X communication system 200 may be an example of devices associated with a number of different entities. Some UEs 115-a may be integrated with a vehicle 205 or other mobile device. Some UEs 115-a may be integrated with buildings 225 or other fixed structure or device. Some UEs 115-a may be integrated with other roadside assistance applications. For example, signs, infrastructure, power systems, and other entities may include UEs 115-a that communicate using the V2X communication system 200. In some examples, roadside repeaters 230 may include a UE 115-*a* to communicate using the V2X communication system 200. The V2X communication system 200 may also connect UEs 115-*a* associated with individuals. For example, UEs 115-*a* (e.g., smartphones) associated with of drivers, pedestrians, and/or other individuals may communicate using the V2X communication system 200. The UEs 115-*a* may be examples of the UEs 115 described with reference to FIG. 1.

In some cases, a first UE 115-*a* may broadcast a packet to one or more other UEs 115-*a* in the V2X communication system 200. As part of the broadcast, a second UE 115-*a* may receive the packet from the first UE 115-*a*. For example, the first UE 115-*a* may be integrated with a vehicle 205 and the second UE 115-*a* may be included in a roadside repeater 230. In some examples, the second UE 115-*a* may perform a decoding procedure after receiving the packet. For example, the second UE 115-*a* may first decode control header information of the received multicast packet and then attempt to decode data of the received multicast packet. Upon successfully decoding the control header information and failing to decode the data included in a multicast packet, the second UE 115-*a* may, in transmit a NACK to the first UE 115-*a*.

Figure 2B:
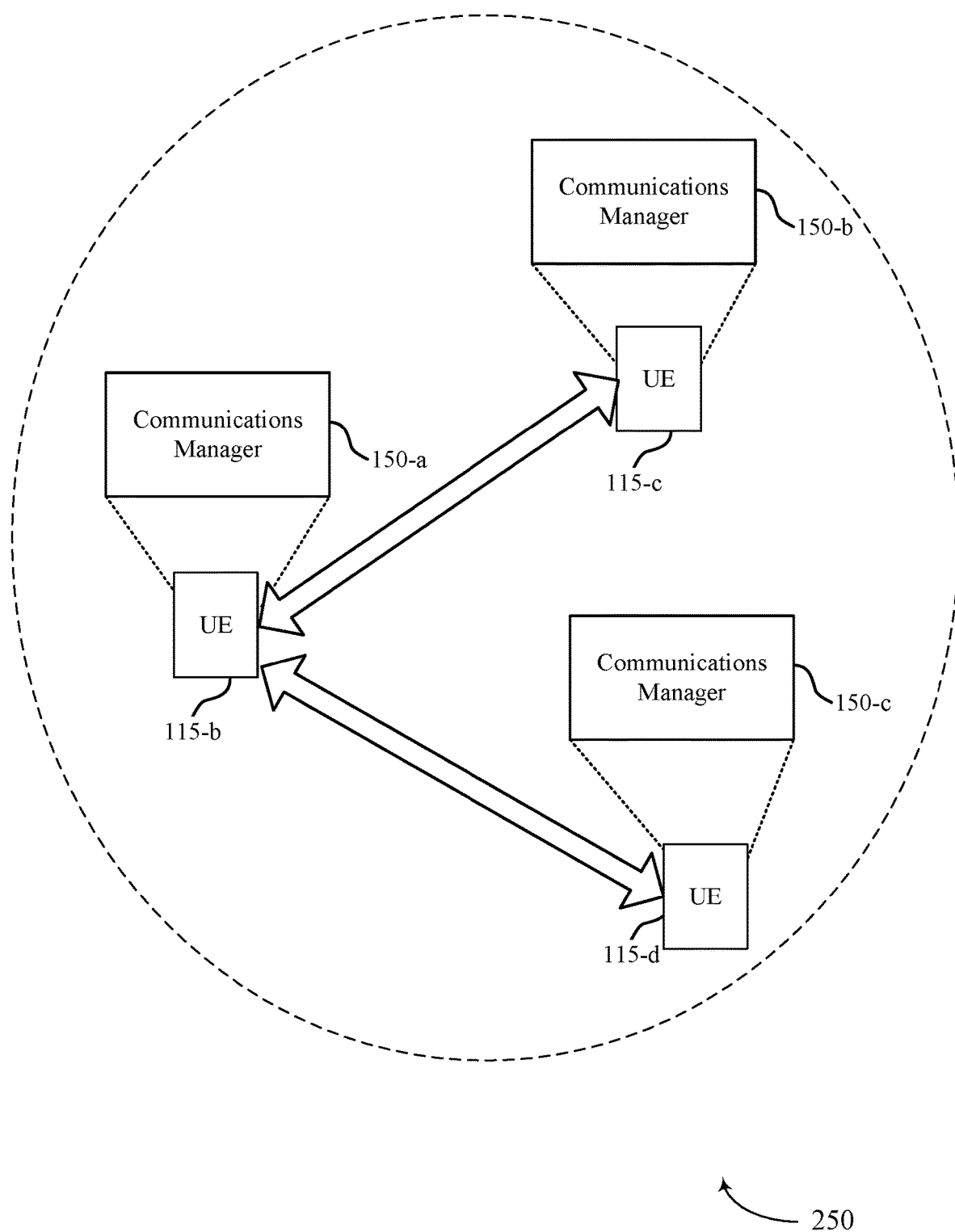
FIG. 2B illustrates an example of a V2X communication system that supports NR V2X NACK based multicast in accordance with one or more aspects of the present disclosure.

FIG. 2B illustrates an example of a V2X communication system 250 that supports NR V2X NACK based multicast in accordance with one or more aspects of the present disclosure. In some examples, the V2X communication system 250 may implement aspects of the V2X communication system 200 and the wireless communications system 100.

V2X communication system 250 may include UEs 115-*b*, 115-*c* and 115-*d*. UE 115-*c* may be integrated with a vehicle as described with reference to FIG. 2. UEs 115-*b*, 115-*c* and/or 115-*d* may be examples of a UE 115 described with reference to FIG. 1 (e.g. a phone, laptop, vehicle, etc.), and may be configured for V2X communication over one or more carriers of a shared frequency bandwidth. In some examples, a vehicle, such as the UEs 115-*b*, 115-*c* and 115-*d*, may execute one or more sets of codes or sequences, to control the functional elements of the device, and perform some or all of the functions described below.

UEs 115-*b*, 115-*c* and 115-*d* may be configured to receive and transmit one or more indications or notifications (e.g., NACKs) to improve reliability of a transmission. Each of the UEs 115-*b*, 115-*c* and 115-*d* may be configured to transmit a multicast packet. In one example, UE 115-*b* may transmit a multicast packet. Before transmitting, UE 115-*b* may determine an identifier associated with UE 115-*b*. The identifier may, in some examples, be a transmitter identifier. In one example, UE 115-*b* may derive a determined (e.g., predetermined or predefined) number of bits based on the transmitter identifier. UE 115-*b* may be configured to add at least a portion of the transmitter identifier to control header information in the multicast packet. Thus, the control header information of the multicast packet may include an indication of the transmitter of the packet. The multicast packet may then be broadcasted to the other UEs within the coverage network of UE 115-*b*.

In line with the example shown in FIG. 2, UE 115-*b* transmits the multicast packet to UE 115-*c* and UE 115-*d*. In some examples, UE 115-*b* may periodically send a basic safety message, a cooperation awareness message, or both. The basic safety message transmitted by UE 115-*b* may provide information about a location of a UE 115-*b*. In such cases, the multicast packet may belong to the basic safety message and/or a cooperation awareness message. In some examples, the multicast packet may belong to sensor information message shared between multiple vehicles in a V2X communication system (or D2D communication system).

In some cases, UE 115-*c* and UE 115-*d* may be configured to receive the multicast packet transmitted by UE 115-*b*. In some examples, UE 115-*c* and UE 115-*d* may receive a subset of the multicast packets transmitted by UE 115-*b*. Upon receiving a multicast packet, UE 115-*c* and UE 115-*d* may perform a decoding procedure. In some examples, the decoding procedure may include decoding at least some of a received multicast packet (e.g., decoding a control portion of the received multicast packet and/or decoding of a data portion of the received multicast packet). In one example, both UE 115-*c* and UE 115-*d* may successfully decode control header information from the received multicast packet but fail to decode the data included in the received multicast packet. In some examples, any one of UE 115-*c* and UE 115-*d* may successfully decode control header information from the received multicast packet and fail to decode the data included in the received multicast packet. If a UE successfully decodes the control header information as well as the data included in a multicast packet, then the UE does not send a NACK to the transmitter (e.g., UE 115-*b* in this exemplary case).

Upon successfully decoding the control header information and failing to decode the data included in a multicast packet, UE 115-*c* and/or UE 115-*d* may determine a transmitter identifier from the control header information. This transmitter identifier may be determined from the transmitter identifier added to the control header information by UE 115-*b* before transmitting the packet. Using the transmitter identifier, UE 115-*c* and/or UE 115-*d* may determine whether they are interested in receiving transmissions from UE 115-*b*. In V2X communication system (or in D2D communication system), an interest in receiving transmission may be based on a location of the transmitter. In one example, a receiving UE (UE 115-*c* and/or UE 115-*d* in this example) may become interested in information from a vehicle at one particular time based on a location information of transmitting UE 115-*b*, a sensor information of the transmitting UE 115-*b*, or a combination thereof.

In some examples, UE 115-*c* and/or UE 115-*d* may retrieve a list of one or more transmitter identifiers. The list of transmitter identifiers may comprise one or more identifiers of transmitters that the receiving UEs are interested in. For example, UE 115-*c* may retrieve a first list of transmitter identifiers indicating the identifiers of transmitters that are of interest to UE 115-*c*. In some cases, the list of transmitter identifiers is derived from upper layers. The list of transmitter identifiers may be based on prior information received by UE 115-*c* and/or UE 115-*d*, in form of safety messages. In some examples, the list of transmitter identifiers may be based on one or more transmitters located within a determined distance, a type of a sensor information, a combination of one or more types of sensor information, or a combination thereof. In some examples, the type of sensor information may include like RADAR, LIDAR, ultrasonic sensor information, camera sensor information, audio sensor information, or a combination thereof.

In some examples, the list of transmitter identifiers may comprise a full identifier, a partial identifier, a sequence derived from an identifier, or a combination thereof. In some cases, UE 115-*c* and/or UE 115-*d* may determine whether the transmitter identifier determined from the control header information of the received multicast packet is present in the list of transmitter identifiers. In other words, UE 115-*c* and/or UE 115-*d* may determine whether the received multicast packet is of sufficient interest to UE 115-*c* and/or UE 115-*d*.

In one example, UE 115-*c* and/or UE 115-*d* may determine that the received multicast packet is of interest and may transmit a NACK to UE 115-*b*. The NACK may, in some examples, be transmitted as a sequence of values. In some cases, the sequence may include an identification of the transmitter (e.g., UE 115-*b*) and/or the packet associated with the NACK. Additionally or alternatively, a first sequence generated by UE 115-*c* and a second sequence generated by UE 115-*d* may be orthogonal sequences. In some examples, UE 115-*c* and/or UE 115-*d* may determine a sequence identifier based on the transmitter identifier. Upon determining the sequence identifier, UE 115-*c* and/or UE 115-*d* may generate a sequence using the sequence identifier. Thus, the sequence may include identification information of UE 115-*b* and the packet associated with the NACK.

In some cases, UE 115-*c* and/or UE 115-*d* may identify time and frequency resources used by UE 115-*b* to transmit the multicast packet. Under such circumstances, UE 115-*c* and/or UE 115-*d* may determine the sequence identifier using the time and frequency resources. As one example, UE 115-*c* and/or UE 115-*d* may provide the time and frequency resources as an input to a hash function. The hash function may generate a sequence identifier and UE 115-*c* and/or UE 115-*d* may generate a sequence using the sequence identifier. In another example, UE 115-*c* and/or UE 115-*d* may provide the transmitter identifier as an input to the hash function. In some examples, UE 115-*c* and/or UE 115-*d* may provide both time and frequency resources as well as the transmitter identifier as inputs to the hash function. In such cases, because the hash function uses both time and frequency resources as well as transmitter identifier to generate the sequence identifier, the sequence identifiers are unique to the transmission of the multicast packet and can be treated accordingly. In some examples, the sequence generated using the sequence identifier may be transmitted as a signal. In some examples, UE 115-*c* may generate a first sequence and UE 115-*d* may generate a second sequence. The first sequence and the second sequence may be orthogonal sequences.

In some examples, UE 115-*c* and/or UE 115-*d* may determine time and frequency resources for transmitting the sequence using any other method. For example, the time and frequency resources for transmitting the sequence may be the same as the time and frequency resources associated with transmission of the multicast packet. In another example, UE 115-*c* and/or UE 115-*d* may randomly derive the time and/or frequency resources for transmitting the sequence. In some examples, a length of the sequence may be based on a length of a transmission associated with the multicast packet. For example, UE 115-*c* and/or UE 115-*d* may determine a length of a transmission of the multicast packet from UE 115-*b*. UE 115-*c* and/or UE 115-*d* may use the same length of transmission when transmitting the sequence for NACK to UE 115-*b*. In some examples, the length of the sequence may be same as the length of a transmission associated with the multicast packet. For example, the sequence may comprise of the same number of resource blocks as the transmission associated with the multicast packet. In some examples, the length of the sequence may be preconfigured.

In cases of a wideband transmission, keeping the length of the sequence may be same as the length of a transmission associated with the multicast packet may increase the reliability of the NACK. In some cases, UE 115-*c* and/or UE 115-*d* may be configured to determine whether the length of the transmission of the multicast packet satisfies a threshold. If the length of the transmission of the multicast packet satisfies the threshold, then UE 115-*c* and/or UE 115-*d* may generate the sequence of the length of the transmission of the multicast packet. In some cases, the threshold may be 10 resource blocks.

Upon determining the sequence, UE 115-*c* and/or UE 115-*d* may transmit the NACK as the sequence. Before transmitting, UE 115-*c* and/or UE 115-*d* may identify a symbol to transmit the NACK on. In some examples, UE 115-*c* and/or UE 115-*d* may determine frequency resources for transmitting the NACK. In reception mode, UE 115-*c* and/or UE 115-*d* may continuously receive transmission. In one example, UE 115-*c* and/or UE 115-*d* may receive transmission from UE 115-*b*. UE 115-*c* and/or UE 115-*d* may be configured to determine an energy for each symbol of the received transmission. Based on that, UE 115-*c* and/or UE 115-*d* may be configured to choose a frequency resource which has the least amount of energy. UE 115-*c* and/or UE 115-*d* may utilize that frequency resource to transmit the NACK. In some cases, the frequency resources may be a subset of the gap symbol.

In some examples, the NACK may be transmitted during a gap symbol. In one example, a control symbol is transmitted before data in a TTI bundle. In some examples, a gap symbol may exist (e.g., be positioned) after the TTI bundle. In some cases, the gap is designed so that a transmitter can switch to a receiver mode from a transmitter mode during the gap. In some examples, UE 115-*c* and/or UE 115-*d* may utilize the gap symbol to transmit the NACK. In some examples, the NACK may be sent on a last symbol of a TTI. In some other examples, the NACK may be sent on a gap symbol after configured number of TTIs. Alternatively, the NACK may be sent on any of the gap symbols of a TTI within a configured window length. In such cases, the window length may be a length of time.

UE 115-*b* may receive the NACK from UE 115-*c* and/or UE 115-*d*. Upon receiving the NACK, UE 115-*b* may determine a sequence identifier from the NACK. In some cases, UE 115-*b* may compare the sequence identifier to a transmitter identifier to identify the multicast packet associated with the NACK. In some cases, UE 115-*b* may receive a first sequence associated with a first NACK from UE 115-*c* and a second sequence associated with a second NACK from UE 115-*d*. In such cases, the first sequence and the second sequence are orthogonal to each other.

In some cases. UE 115-*b* may wait for a threshold time to receive the NACK. In some examples, the threshold time may be a threshold number of TTI bundling durations. Upon reception of NACK within threshold time, UE 115-*b* may retransmit the multicast packet. For example, UE 115-*b* may receive a NACK from UE 115-*c*. The NACK may relate to of previously transmitted multicast packet. Upon receiving the NACK, UE 115-*b* may retransmit the multicast packet to 115-*c*. In some cases, UE 115-*b* may include an indication of retransmission in the control header information of the multicast packet.

Figure 3:
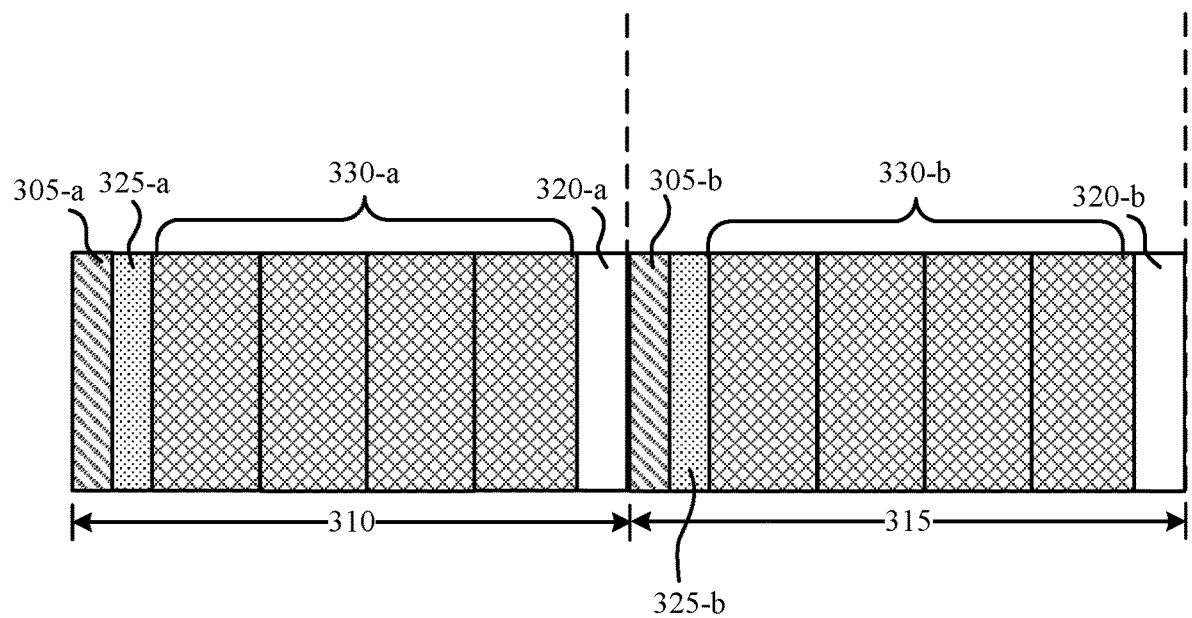
FIG. 3 illustrates an example of TTI bundling durations that supports NR V2X NACK based multicast in accordance with one or more aspects of the present disclosure.

FIG. 3 illustrates an example of TTI bundling durations 300 that supports NR V2X NACK based multicast in accordance with one or more aspects of the present disclosure. In some examples, TTI bundling durations 300 may implement aspects of wireless communications systems 100 or V2X communication system 200 or 250 as described with reference to FIGS. 1, 2A and 2B. As shown, TTI bundling durations 300 includes a first TTI bundle duration 310 and a second TTI bundle duration 315.

A UE 115 may be configured for V2X communication. A UE 115 may be configured to receive a multicast packet transmitted by another UE 115. In one example, UE 115 may be a vehicle. As shown in the example of FIG. 3, a UE 115 may be configured to perform LBT 305-a before receiving the multicast packet transmission. After performing LBT 305-a, UE 115 may receive control header information 325-a associated with the multicast packet in the next symbol. In some cases, the control header information 325-a may be Physical Shared Control Channel (PSCCH). In one example, a control symbol is transmitted before data in a TTI bundle. In reception mode, UE 115 may then receive data 330-a over the next one or more TTIs. In the example of FIG. 3, UE 115 receives data 330-a over 4 TTIs. If UE 115 successfully decodes at least a portion of the control header information 325-a and fails to decode the data 330-a, then UE 115 may transmit a NACK. In some examples, the NACK may be transmitted during a gap symbol 320-a during the first TTI bundle duration 310. In some examples, the NACK may be transmitted during a gap symbol 320-a during the first TTI bundle duration 310. In some other examples, the NACK associated with the first TTI bundle duration 310 may be sent during the gap symbol 320-b. In some examples, the NACK may be transmitted during a gap symbol 320-b during the second TTI bundle duration 315. In some cases, the NACK may be transmitted over a symbol after a configured number of TTIs.

As further shown in the example of FIG. 3, during the second TTI bundle duration 315, UE 115 may be configured to perform LBT 305-b and then receive control header information 325-b associated with a second multicast packet. In some cases, the control header information 325-b may be PSCCH. UE 115 may receive data 330-b over the next one or more TTIs. UE 115 may receive data 330-b over 4 TTIs during the second TTI bundle duration 315. Upon successfully decoding at least a portion of the control header information 325-b and failing to decode the data 330-b, UE 115 may transmit a NACK. In some examples, the NACK associated with the second TTI bundle duration 315 may be transmitted during a gap symbol 320-b. In some examples, the gap symbol 320-b may be used to transmit a first NACK associated with the first TTI bundle duration 310 and a second NACK associated with the second TTI bundle duration 315. In some cases, the NACK associated with the second TTI bundle duration 315 may be transmitted over a symbol after configured number of TTIs.

Figure 4:
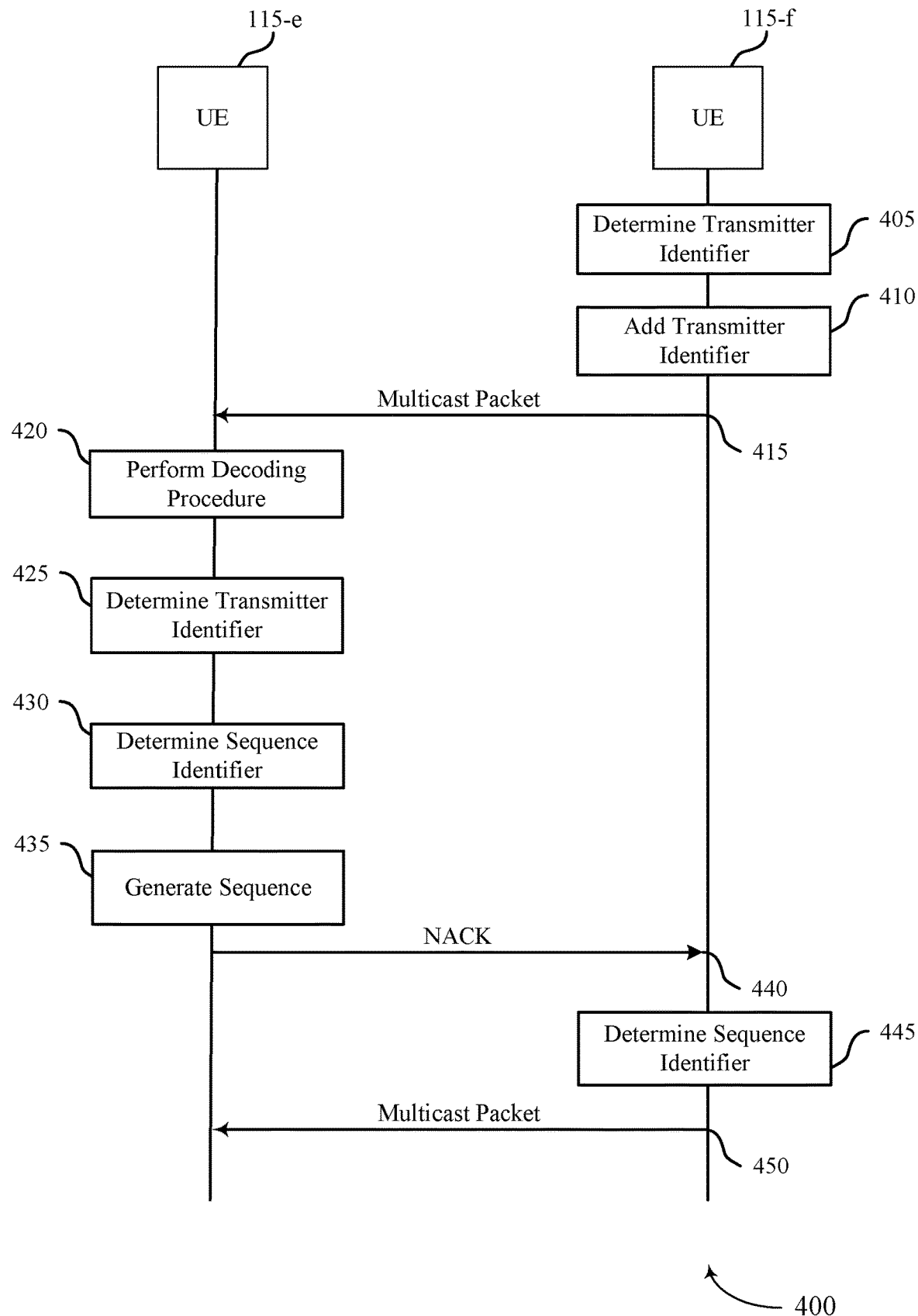
FIG. 4 illustrates an example of a process flow that supports NR V2X NACK based multicast in accordance with one or more aspects of the present disclosure.

FIG. 4 illustrates an example of a process flow 400 that supports NR V2X NACK based multicast in accordance with one or more aspects of the present disclosure. In some examples, process flow 400 may implement aspects of wireless communications systems 100 or V2X communication systems 200 and 250 as described with reference to FIGS. 1, 2A and 2B. In some cases, process flow 400 may represent aspects of techniques performed by one or more vehicles such as UEs 115, as described with reference to FIGS. 1, 2A, 2B, and 3. Within process flow 400, UE 115-b and UE 115-c may be configured to implement both NACK transmission and NACK reception procedures.

At 405, UE 115-f may determine a transmitter identifier associated with a multicast packet. UE 115-f may determine an identifier associated with a multicast packet of an upcoming transmission. The identifier may be configured to uniquely identify UE 115-f and the multicast packet that it is associated with. In some examples, the transmitter identifier may be a determined number of bits from an unique identification number of UE 115-f.

At 410, UE 115-f may add at least a portion of the transmitter identifier to control header information in a multicast packet. In some cases, UE 115-f may add the transmitter identifier to the multicast packet before transmitting the multicast packet. In one example, UE 115-f may encode the transmitter identifier into the control header information using an Modulation Coding Scheme (MCS). In some examples, UE 115-f may be configured to add at least a portion of the transmitter identifier to the control header information in the multicast packet.

At 415, UE 115-f may transmit the multicast packet to one or more devices. The one or more devices may include UE 115-b. In some examples, the multicast packet may then be broadcasted to the other UEs (e.g., UE 115-e).

At 420, UE 115-e may perform a decoding procedure. UE 115-e may be configured to receive the multicast packet transmitted by UE 115-f. In some examples, UE 115-e may receive the multicast packet during a TTI bundle duration. Upon receiving the multicast packet, UE 115-e may initiate a decoding procedure. As part of the decoding procedure, UE 115-e may decode the control header information in the received multicast packet. UE 115-e may then attempt to decode data from the received multicast packet. In one example, UE 115-e may successfully decode control header information from the received multicast packet and fail to decode the data included in the received multicast packet.

At 425, UE 115-e may determine a transmitter identifier associated with the received multicast packet. In some examples, UE 115-e may determine a transmitter identifier from the control header information. This transmitter identifier may be determined from the transmitter identifier added to the control header information by UE 115-f before transmitting the multicast packet.

Further, in some examples, UE 115-e may retrieve a list of transmitter identifiers. In some examples, the list of transmitters may be determined (e.g., predetermined or preconfigured). The list of transmitter identifiers may comprise one or more identifiers of transmitters that the receiving UEs are interested in. For example, the list of transmitter identifiers may be based on one or more transmitters located within a determined distance, a type of a sensor information, a combination of one or more types of sensor information, or a combination thereof. In some examples, the type of sensor information may include like RADAR, LIDAR, ultrasonic sensor information, camera sensor information, audio sensor information, or a combination thereof.

At 430, UE 115-e may determine a sequence identifier. In some examples, the sequence identifier may be based on the transmitter identifier. In some examples, UE 115-e may identify time and frequency resources used by UE 115-f to transmit the multicast packet. In such examples, UE 115-f may determine the sequence identifier using the time and frequency resources. In some example, UE 115-e may provide the transmitter identifier as an input to a hash function, and the hash function may be configured to generate the sequence identifier based on the input.

At 435, UE 115-e may generate the sequence based on the sequence identifier. In some examples, the length of the sequence may be same as the length of a transmission associated with the multicast packet. For example, the sequence may comprise of the same number of resource blocks as the transmission associated with the multicast packet. In some examples, the length of the sequence may be preconfigured.

At 440, UE 115-*e* may transmit a NACK based on the determining the sequence. In some examples, UE 115-*e* may transmit the NACK as the sequence. In some examples, UE 115-*e* may identify a symbol to transmit the NACK on. In some examples, the NACK may be transmitted during a gap symbol. In some alternative examples, the NACK may be sent on a last symbol of a TTI. In some other examples, the NACK may be sent on a gap symbol after configured number of TTIs. In some cases, the NACK may be sent on any of the gap symbol of a TTI within a configured window length. In such cases, the window length may be time.

At 445, UE 115-*f* may determine a sequence identifier associated with the NACK. In some examples, UE 115-*f* may receive the NACK from UE 115-*e* and may determine a sequence identifier from the NACK. In some cases, UE 115-*f* may compare the sequence identifier to a transmitter identifier to identify the multicast packet associated with the NACK. In some cases, using the sequence identifier, UE 115-*f* may further identify a sequence associated with the received NACK.

At 450, UE 115-*f* may retransmit the multicast packet. In some cases, during retransmission, UE 115-*f* may be configured to include an indication of retransmission in the control header information of the multicast packet.

Figure 5:
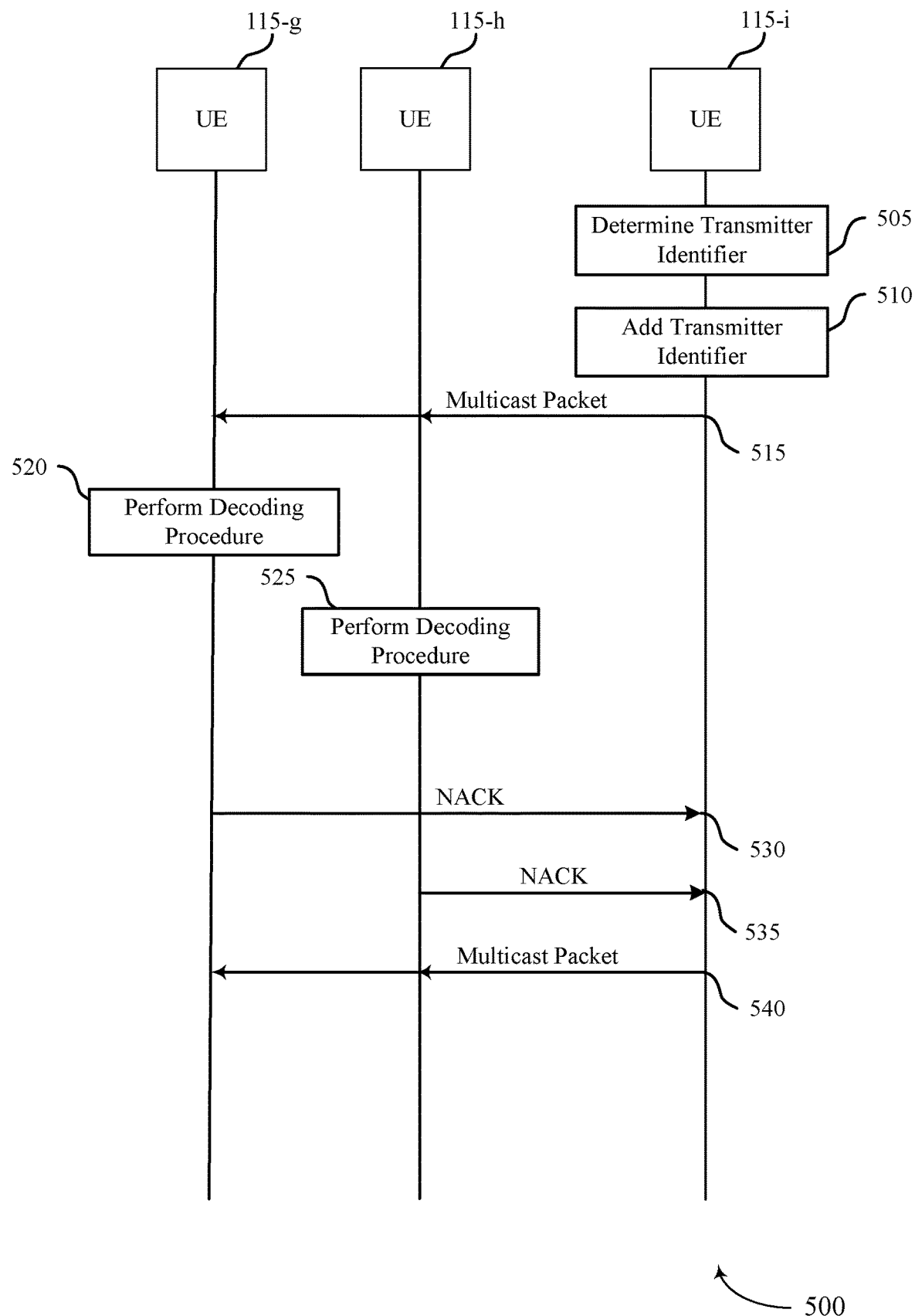
FIG. 5 illustrates an example of a process flow that supports NR V2X NACK based multicast in accordance with one or more aspects of the present disclosure.

FIG. 5 illustrates an example of a process flow 500 that supports NR V2X NACK based multicast in accordance with one or more aspects of the present disclosure. In some examples, process flow 500 may implement aspects of wireless communications systems 100 or V2X communication systems 200 and 250 as described with reference to FIGS. 1, 2A and 2B. In some cases, process flow 500 may represent aspects of techniques performed by one or more vehicles such as UEs 115, as described with reference to FIGS. 1, 2A, 2B and 4.

At 505, UE 115-*i* determine a transmitter identifier associated with a multicast packet. UE 115-*i* may determine an identifier associated with a multicast packet of an upcoming transmission. In one example, the transmitter identifier may be a determined number of bits from an unique identification number of UE 115-*i*.

At 510, UE 115-*i* may add at least a portion of the transmitter identifier to control header information of the multicast packet. In some cases, UE 115-*i* may add the transmitter identifier to the multicast packet before transmitting the multicast packet. UE 115-*i* may be configured to add the transmitter identifier suing methods describes with reference to FIGS. 1 through 4.

At 515, UE 115-*i* may transmit the multicast packet to one or more devices. The one or more devices may include UE 115-*g* and UE 115-*h*.

At 520, UE 115-*g* may perform a decoding procedure. UE 115-*g* may be configured to receive the multicast packet transmitted by UE 115-*i*. Upon receiving the multicast packet, UE 115-*g* may initiate a decoding procedure. As part of the decoding procedure, UE 115-*g* may decode the control header information in the received multicast packet. UE 115-*g* may attempt to decode data from the received multicast packet. UE 115-*g* may successfully decode control header information from the received multicast packet and fail to decode the data included in the received multicast packet.

At 525, UE 115-*h* may perform a decoding procedure. UE 115-*h* may be configured to receive the multicast packet transmitted by UE 115-*i*. Upon receiving the multicast packet, UE 115-*h* may initiate a decoding procedure. In some examples, UE 115-*h* may successfully decode control header information from the received multicast packet and fail to decode the data included in the received multicast packet.

At 530, UE 115-*g* may transmit a NACK based on an unsuccessful attempt to decode the data in the received multicast packet. In some examples, UE 115-*g* may identify a sequence identifier based on a transmitter identifier associated with the received multicast packet. UE 115-*g* may then generate a first sequence based on the sequence identifier. In some examples, UE 115-*g* may transmit the NACK as the first sequence.

At 535, UE 115-*h* may transmit a NACK based on successfully decoding the control header information and failing to decode the data included in the multicast packet. In some examples, UE 115-*h* may identify a sequence identifier based on a transmitter identifier associated with the received multicast packet. UE 115-*h* may then generate a second sequence based on the sequence identifier. In some examples, UE 115-*h* may transmit the NACK as the second sequence. In some examples, NACK transmitted by UE 115-*h* may be at a later time than NACK transmitted by UE 115-*g*.

At 545, UE 115-*i* may retransmit the multicast packet. UE 115-*i* may receive the first sequence and the second sequence and determine whether to retransmit the multicast packet based on the first sequence and the second sequence. In some examples, the first sequence and the second sequence are orthogonal to each other. In some cases, during retransmission, UE 115-*i* may be configured to include an indication of retransmission in the control header information of the multicast packet.

Figure 6:
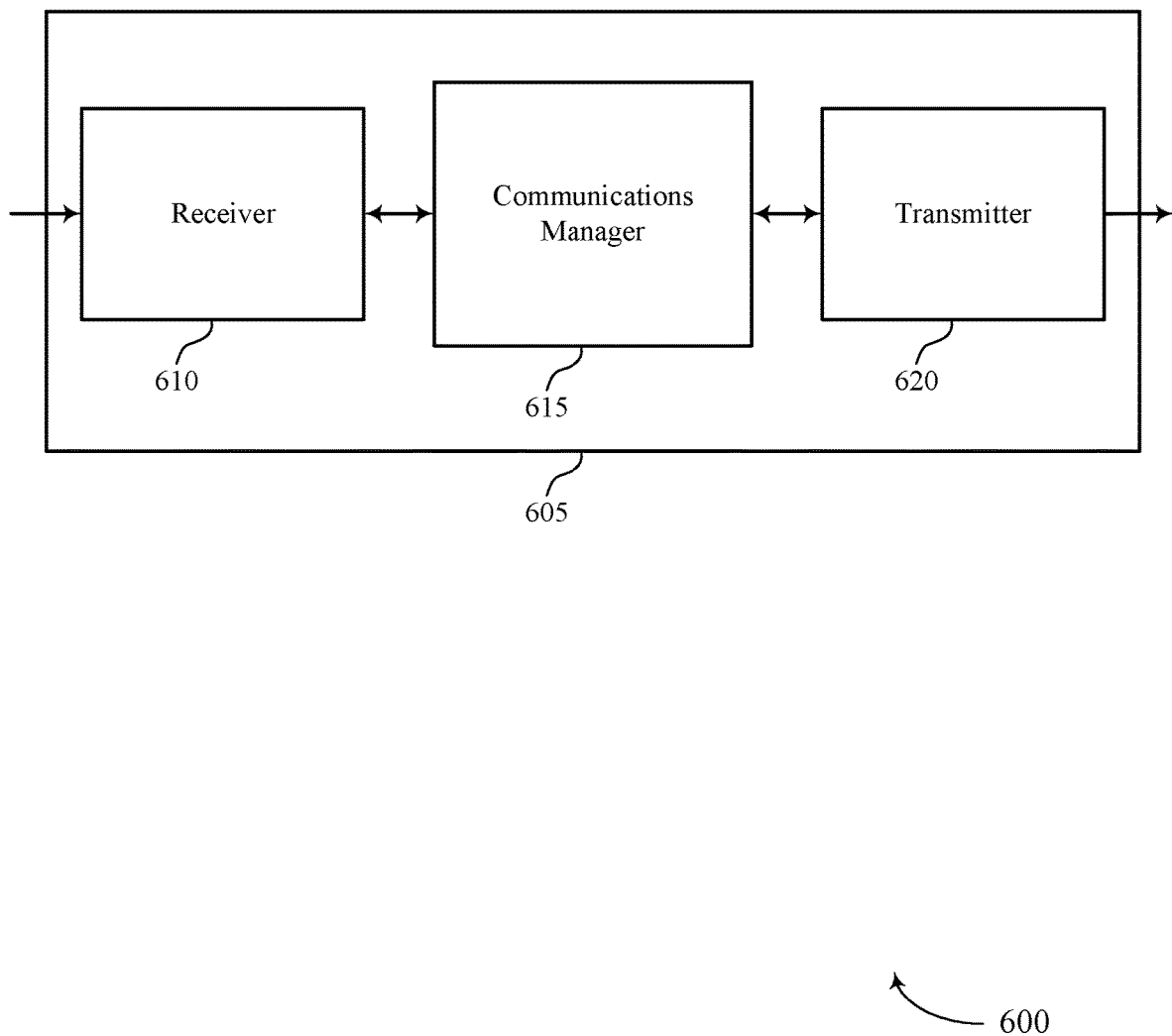
FIGS. 6 through 8 show block diagrams of a device that supports NR V2X NACK based multicast in accordance with one or more aspects of the present disclosure.

FIG. 6 shows a block diagram 600 of a wireless device 605 that supports NR V2X NACK based multicast in accordance with one or more aspects of the present disclosure. Wireless device 605 may be an example of aspects of a wireless device (e.g., base station 105, UE 115) as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to NR V2X NACK based multicast, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may receive a multicast packet from a second device, decode control header information in the received multicast packet, determine that a decoding procedure associated with a payload of the received multicast packet is unsuccessful, and transmit a NACK based on the determining. In some cases, the second device may be a stationary vehicle, a vehicle in motion, a UE, a motion sensor, a camera sensor, a LIDAR sensor, a RADAR sensor, or any combination thereof. The communications manager 615 may also transmit a multicast packet to one or more devices, receive a NACK, the NACK including a sequence identifier indicating that a decoding procedure associated with a payload of the multicast packet is unsuccessful, and retransmit the multicast packet to the one or more devices based on the NACK.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
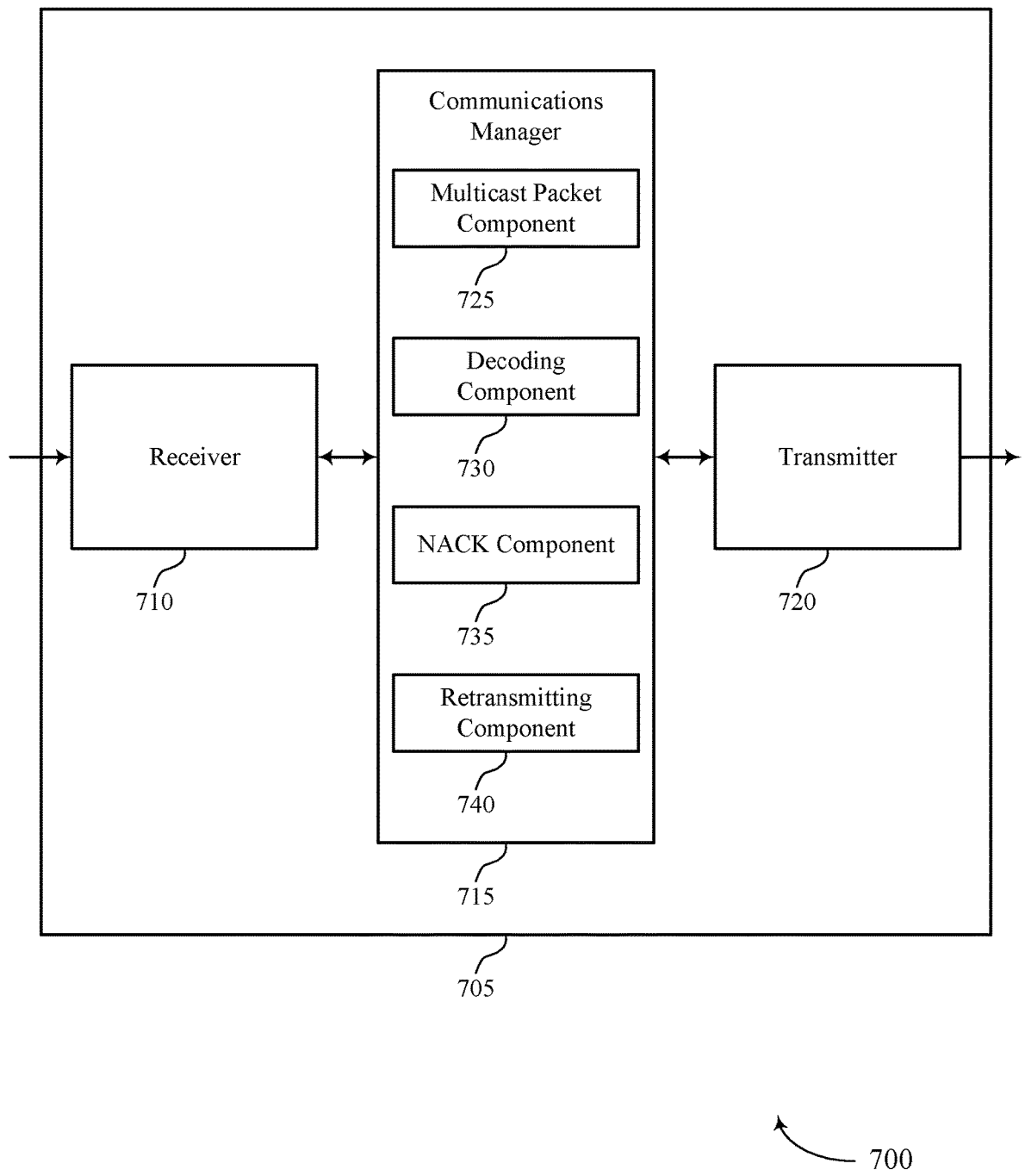

FIG. 7 shows a block diagram 700 of a wireless device 705 that supports NR V2X NACK based multicast in accordance with one or more aspects of the present disclosure. Wireless device 705 may be an example of aspects of a wireless device 605 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to NR V2X NACK based multicast, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include multicast packet component 725, decoding component 730, NACK component 735, and retransmitting component 740.

Multicast packet component 725 may receive a multicast packet from a second device, identify time and frequency resources associated with transmission of the multicast packet, transmit a multicast packet to one or more devices, ad at least a portion of the transmitter identifier to control header information in the multicast packet before transmitting, and determine time and frequency resources associated with transmission of the multicast packet. In some cases, the first device, or the second device, or both include a stationary vehicle, a vehicle in motion, a UE, a motion sensor, a camera sensor, a LIDAR sensor, a RADAR sensor, or any combination thereof. In some cases, the one or more devices may include a stationary vehicle, a vehicle in motion, a UE, a motion sensor, a camera sensor, a LIDAR sensor, a RADAR sensor, or any combination thereof.

Decoding component 730 may decode control header information in the received multicast packet and determine that a decoding procedure associated with a payload of the received multicast packet is unsuccessful.

NACK component 735 may transmit a NACK based on the determining, receive a NACK, and receive a second NACK from a second device different from the first device. In some examples, the NACK may include a sequence identifier indicating that a decoding procedure associated with a payload of the multicast packet is unsuccessful.

Retransmitting component 740 may retransmit the multicast packet to the one or more devices based on the NACK.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
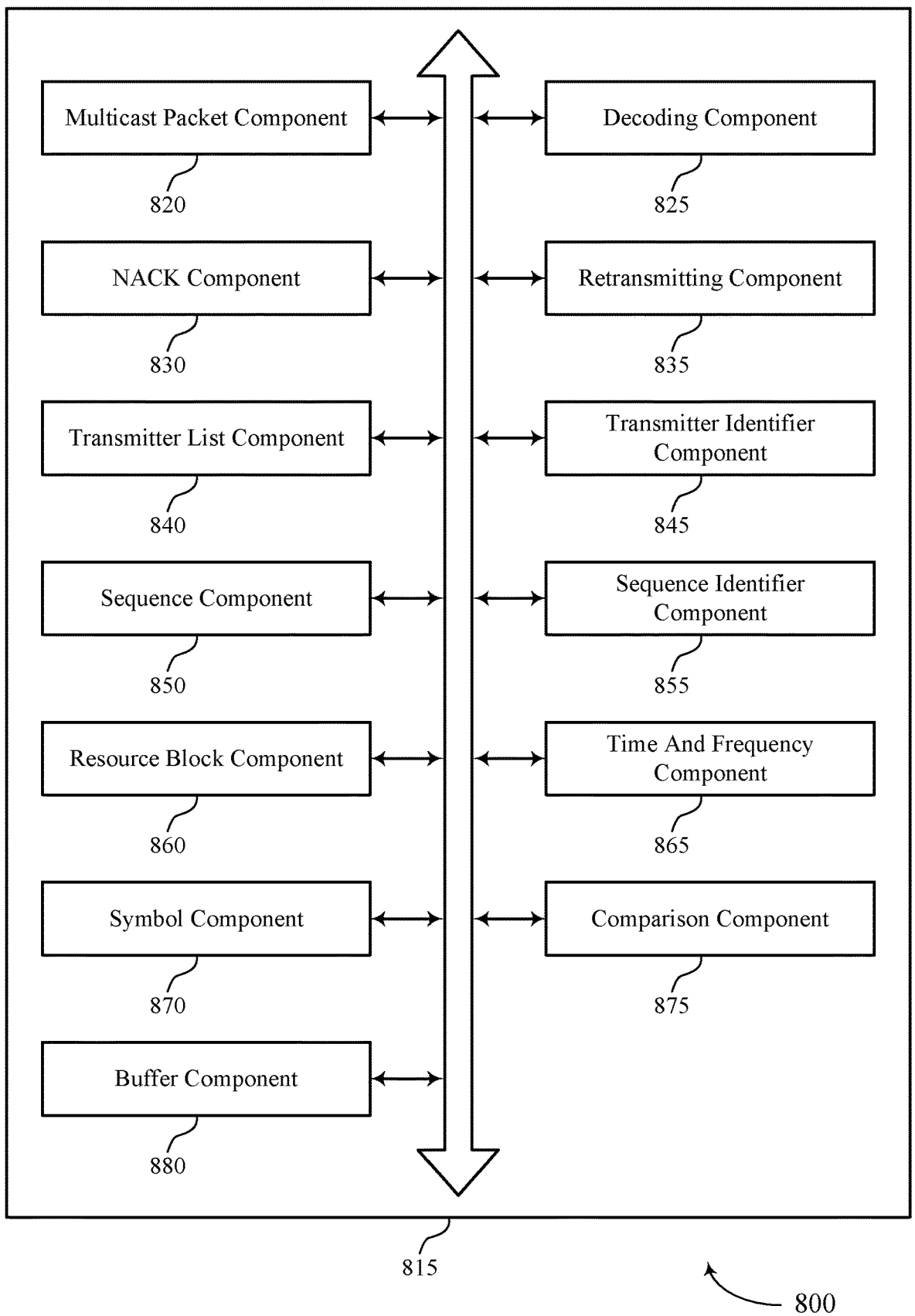

FIG. 8 shows a block diagram 800 of a communications manager 815 that supports NR V2X NACK based multicast in accordance with one or more aspects of the present disclosure. The communications manager 815 may be an example of aspects of a communications manager 615, a communications manager 715, or a communications manager 915 described with reference to FIGS. 6, 7, and 9. The communications manager 815 may include multicast packet component 820, decoding component 825, NACK component 830, retransmitting component 835, transmitter list component 840, transmitter identifier component 845, sequence component 850, sequence identifier component 855, resource block component 860, time and frequency component 865, symbol component 870, comparison component 875, and buffer component 880. Each of these modules may communicate, directly or indirectly, with one another (e.g., via one or more buses).

Multicast packet component 820 may receive a multicast packet from a second device, identify time and frequency resources associated with transmission of the multicast packet, transmit a multicast packet to one or more devices, ad at least a portion of the transmitter identifier to control header information in the multicast packet before transmitting, and determine time and frequency resources associated with transmission of the multicast packet. In some cases, the first device, or the second device, or both include a stationary vehicle, a vehicle in motion, a UE, a motion sensor, a camera sensor, a LIDAR sensor, a RADAR sensor, or any combination thereof. In some cases, the one or more devices include a stationary vehicle, a vehicle in motion, a UE, a motion sensor, a camera sensor, a LIDAR sensor, a RADAR sensor, or any combination thereof.

Decoding component 825 may decode control header information in the received multicast packet and determine that a decoding procedure associated with a payload of the received multicast packet is unsuccessful.

NACK component 830 may transmit a NACK based on the determining, receive a NACK, the NACK including a sequence identifier indicating that a decoding procedure associated with a payload of the multicast packet is unsuccessful, and receive a second NACK from a second device different from the first device. Retransmitting component 835 may retransmit the multicast packet to the one or more devices based on the NACK.

Transmitter list component 840 may retrieve a list of transmitter identifiers, where transmitting the NACK is based on the list of transmitter identifiers. In some cases, the list of transmitter identifiers is based on one or more transmitters located within a determined distance, a type of a sensor information, a combination of one or more types of sensor information, or a combination thereof.

Transmitter identifier component 845 may determine a transmitter identifier associated with the multicast packet based on the decoded control header information and determine that the transmitter identifier is present in the list of transmitter identifiers, where transmitting the NACK is based on the transmitter identifier being present in the list of transmitter identifiers.

Sequence component 850 may generate a sequence associated with the multicast packet, where the transmitted NACK includes the sequence associated with the multicast packet, determine a first sequence associated with the NACK, where the NACK is received from a first device, and determine a second sequence associated with the second NACK, the first sequence and the second sequence being orthogonal to each other, where retransmitting the multicast packet is based on the first sequence and the second sequence. In some cases, a length of the sequence is based on a length of a transmission associated with the multicast packet. In some cases, a length of the sequence is preconfigured.

Sequence identifier component 855 may determine a sequence identifier based on a transmitter identifier, where generating the sequence associated with the multicast packet is based on the sequence identifier, determine a sequence identifier based on the time and frequency resources, where generating the sequence associated with the multicast packet is based on the sequence identifier, determine the sequence identifier from the NACK, and determine the sequence identifier associated with the NACK.

Resource block component 860 may determine at least one resource block associated with the multicast packet and identify an energy level associated with the at least one resource block, where identifying the time and frequency resources based on the energy level.

Time and frequency component 865 may time and frequency resources associated with the sequence is same as the time and frequency resources associated with transmission of the multicast packet, time and frequency resources associated with the sequence are derived randomly, and determine time and frequency resources associated with the sequence identifier, where retransmitting the multicast packet is based on the time and frequency resources associated with the sequence identifier and the time and frequency resources associated with transmission of the multicast packet.

Symbol component 870 may identify a symbol occurring after one or more TTIs, where transmitting the NACK occurs on the identified symbol. In some cases, the identified symbol is a last symbol of a TTI, where transmitting the NACK occurs on the last symbol of the TTI. In some cases, the identified symbol is a gap symbol after a determined number of TTIs, where transmitting the NACK occurs on the gap symbol after the determined number of TTIs. In some cases, the identified symbol is a gap symbol of a TTI within a determined period, where transmitting the NACK occurs on the gap symbol of the TTI within the determined (e.g., predetermined or preconfigured) period.

Comparison component 875 may compare the sequence identifier with the transmitter identifier associated with the multicast packet, where retransmitting the multicast packet is based on the comparing.

Buffer component 880 may flush a buffer associated with retransmitting the multicast packet at a time satisfying a threshold period after transmitting the multicast packet to the one or more devices, where the NACK is received after the threshold period.

Figure 9:
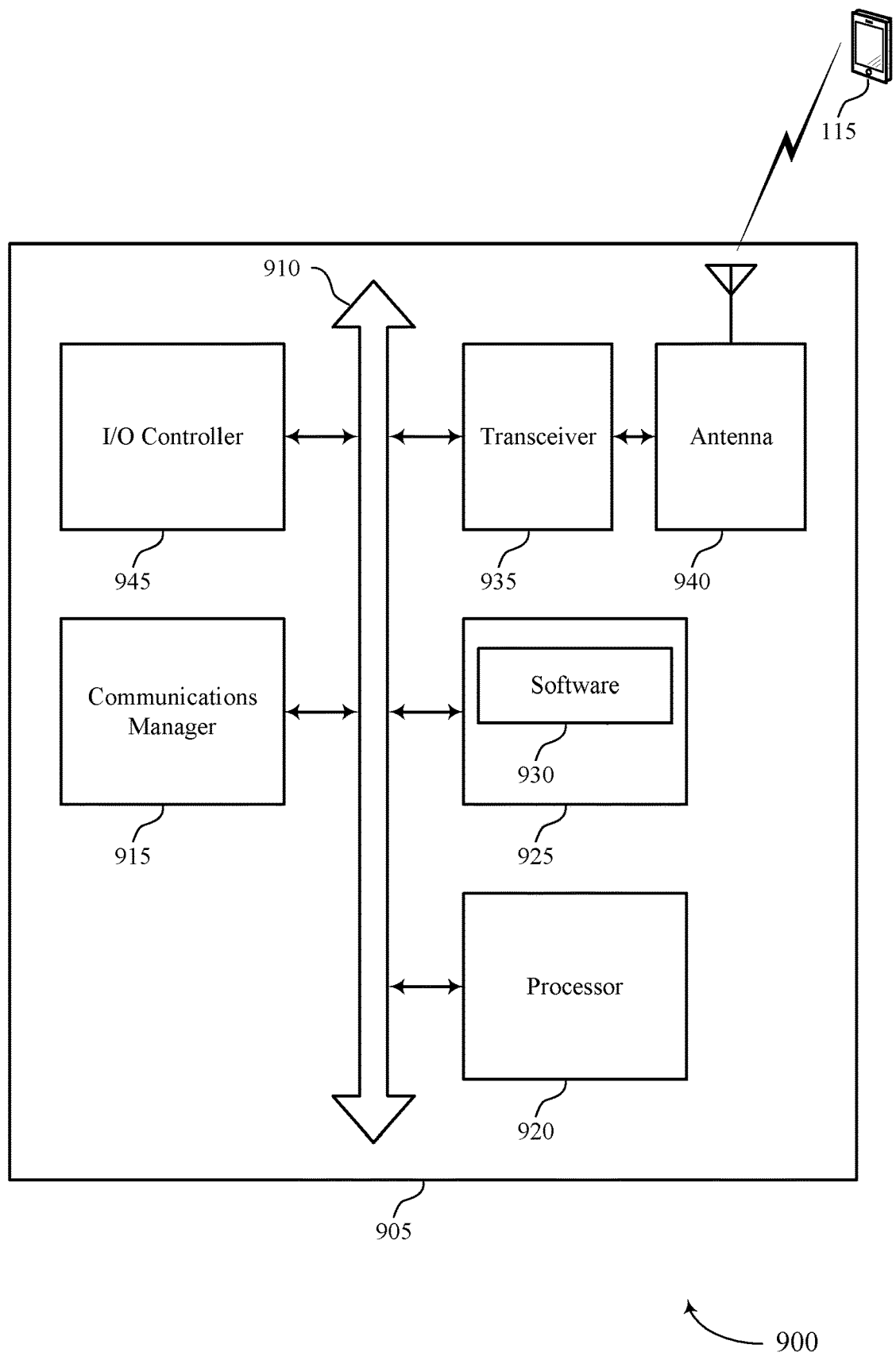
FIG. 9 illustrates a block diagram of a system including a wireless device that supports NR V2X NACK based multicast in accordance with one or more aspects of the present disclosure.

FIG. 9 shows a diagram of a system 900 including a device 905 that supports NR V2X NACK based multicast in accordance with one or more aspects of the present disclosure. Device 905 may be an example of or include the components of wireless device 605, wireless device 705, as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting NR V2X NACK based multicast).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support NR V2X NACK based multicast. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
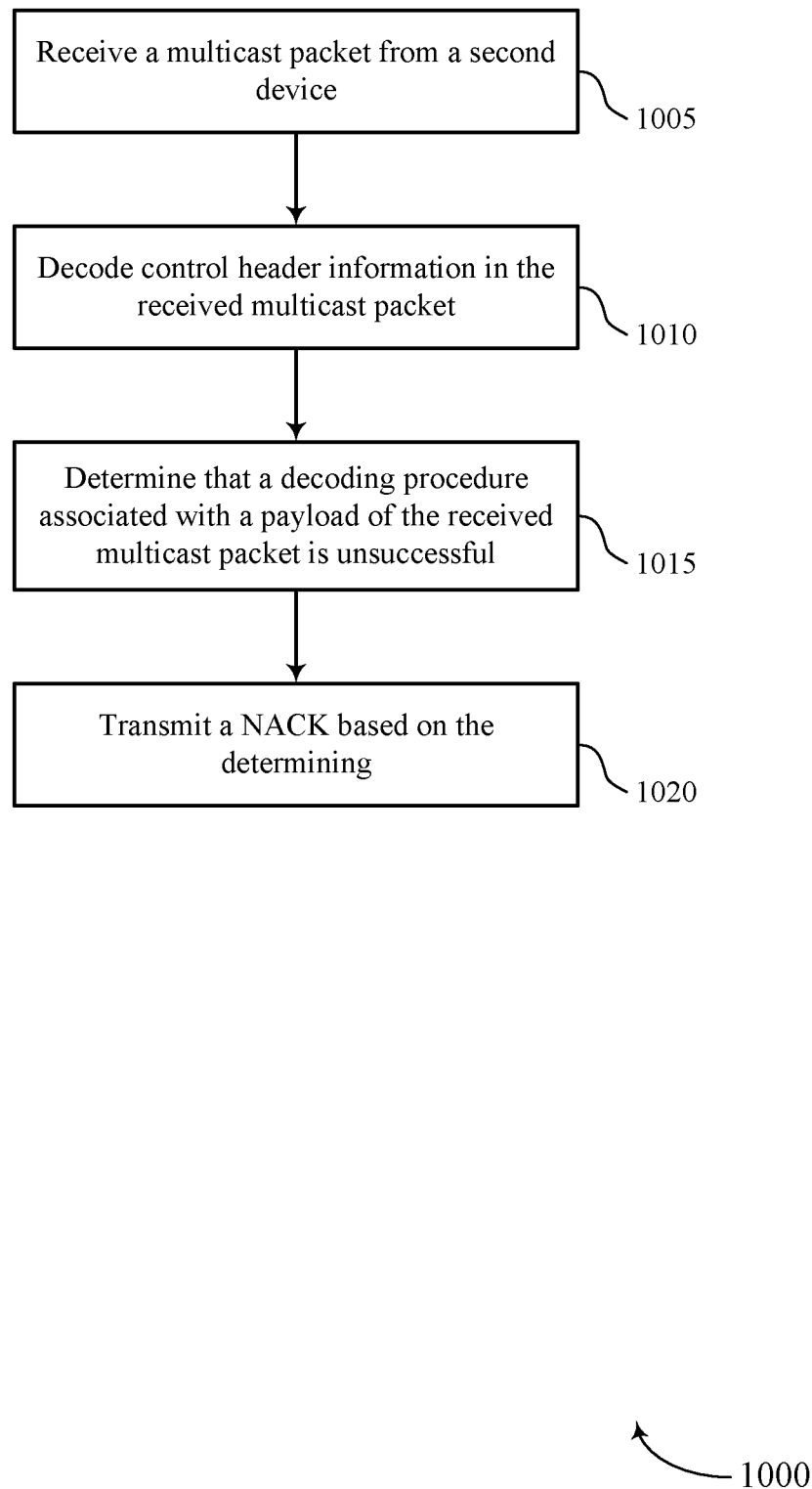
FIGS. 10 through 14 illustrate methods for NR V2X NACK based multicast in accordance with one or more aspects of the present disclosure.

FIG. 10 shows a flowchart illustrating a method 1000 for NR V2X NACK based multicast in accordance with one or more aspects of the present disclosure. The operations of method 1000 may be implemented by a wireless device 605 or its components as described herein. For example, the operations of method 1000 may be performed by a communications manager as described with reference to FIGS. 6 through 9. In some examples, a wireless device 605 may execute a set of codes to control the functional elements of the device to perform the functions described below. Additionally or alternatively, the wireless device 605 may perform aspects of the functions described below using special-purpose hardware.

At block 1005 the wireless device 605 may receive a multicast packet from a second device. The operations of block 1005 may be performed according to the methods described herein. In certain examples, aspects of the operations of block 1005 may be performed by a multicast packet component as described with reference to FIGS. 6 through 9.

At block 1010 the wireless device 605 may decode control header information in the received multicast packet. The operations of block 1010 may be performed according to the methods described herein. In certain examples, aspects of the operations of block 1010 may be performed by a decoding component as described with reference to FIGS. 6 through 9.

At block 1015 the wireless device 605 may determine that a decoding procedure associated with a payload of the received multicast packet is unsuccessful. The operations of block 1015 may be performed according to the methods described herein. In certain examples, aspects of the operations of block 1015 may be performed by a decoding component as described with reference to FIGS. 6 through 9.

At block 1020 the wireless device 605 may transmit a NACK based on the determining. The operations of block 1020 may be performed according to the methods described herein. In certain examples, aspects of the operations of block 1020 may be performed by a NACK component as described with reference to FIGS. 6 through 9.

Figure 11:
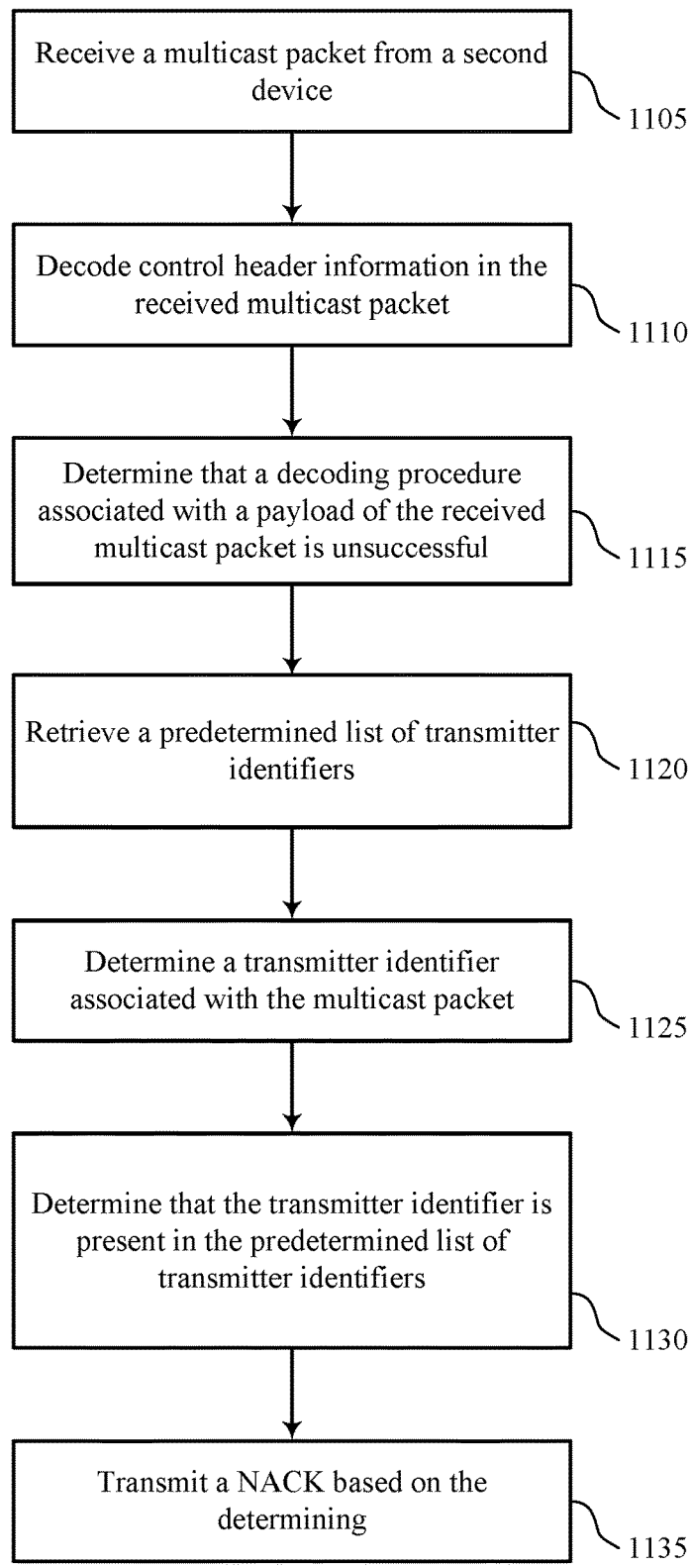

FIG. 11 shows a flowchart illustrating a method 1100 for NR V2X NACK based multicast in accordance with one or more aspects of the present disclosure. The operations of method 1100 may be implemented by a wireless device 605 or its components as described herein. For example, the operations of method 1100 may be performed by a communications manager as described with reference to FIGS. 6 through 9. In some examples, a wireless device 605 may execute a set of codes to control the functional elements of the device to perform the functions described below. Additionally or alternatively, the wireless device 605 may perform aspects of the functions described below using special-purpose hardware.

At block 1105 the wireless device 605 may receive a multicast packet from a second device. The operations of block 1105 may be performed according to the methods described herein. In certain examples, aspects of the operations of block 1105 may be performed by a multicast packet component as described with reference to FIGS. 6 through 9.

At block 1110 the wireless device 605 may decode control header information in the received multicast packet. The operations of block 1110 may be performed according to the methods described herein. In certain examples, aspects of the operations of block 1110 may be performed by a decoding component as described with reference to FIGS. 6 through 9.

At block 1115 the wireless device 605 may determine that a decoding procedure associated with a payload of the received multicast packet is unsuccessful. The operations of block 1115 may be performed according to the methods described herein. In certain examples, aspects of the operations of block 1115 may be performed by a decoding component as described with reference to FIGS. 6 through 9.

At block 1120 the wireless device 605 may retrieve a list of transmitter identifiers. In some cases, transmitting the NACK is based on the list of transmitter identifiers. The operations of block 1120 may be performed according to the methods described herein. In certain examples, aspects of the operations of block 1120 may be performed by a transmitter list component as described with reference to FIGS. 6 through 9.

At block 1125 the wireless device 605 may determine a transmitter identifier associated with the multicast packet. In some cases, the wireless device 605 may determine the transmitter identifier based on the decoded control header information. The operations of block 1125 may be performed according to the methods described herein. In certain examples, aspects of the operations of block 1125 may be performed by a transmitter identifier component as described with reference to FIGS. 6 through 9.

At block 1130 the wireless device 605 may determine that the transmitter identifier is present in the list of transmitter identifiers. In some cases, transmitting the NACK is based on the transmitter identifier being present in the list of transmitter identifiers. The operations of block 1130 may be performed according to the methods described herein. In certain examples, aspects of the operations of block 1130 may be performed by a transmitter identifier component as described with reference to FIGS. 6 through 9.

At block 1135 the wireless device 605 may transmit a NACK based on the determining. The operations of block 1135 may be performed according to the methods described herein. In certain examples, aspects of the operations of block 1135 may be performed by a NACK component as described with reference to FIGS. 6 through 9.

Figure 12:
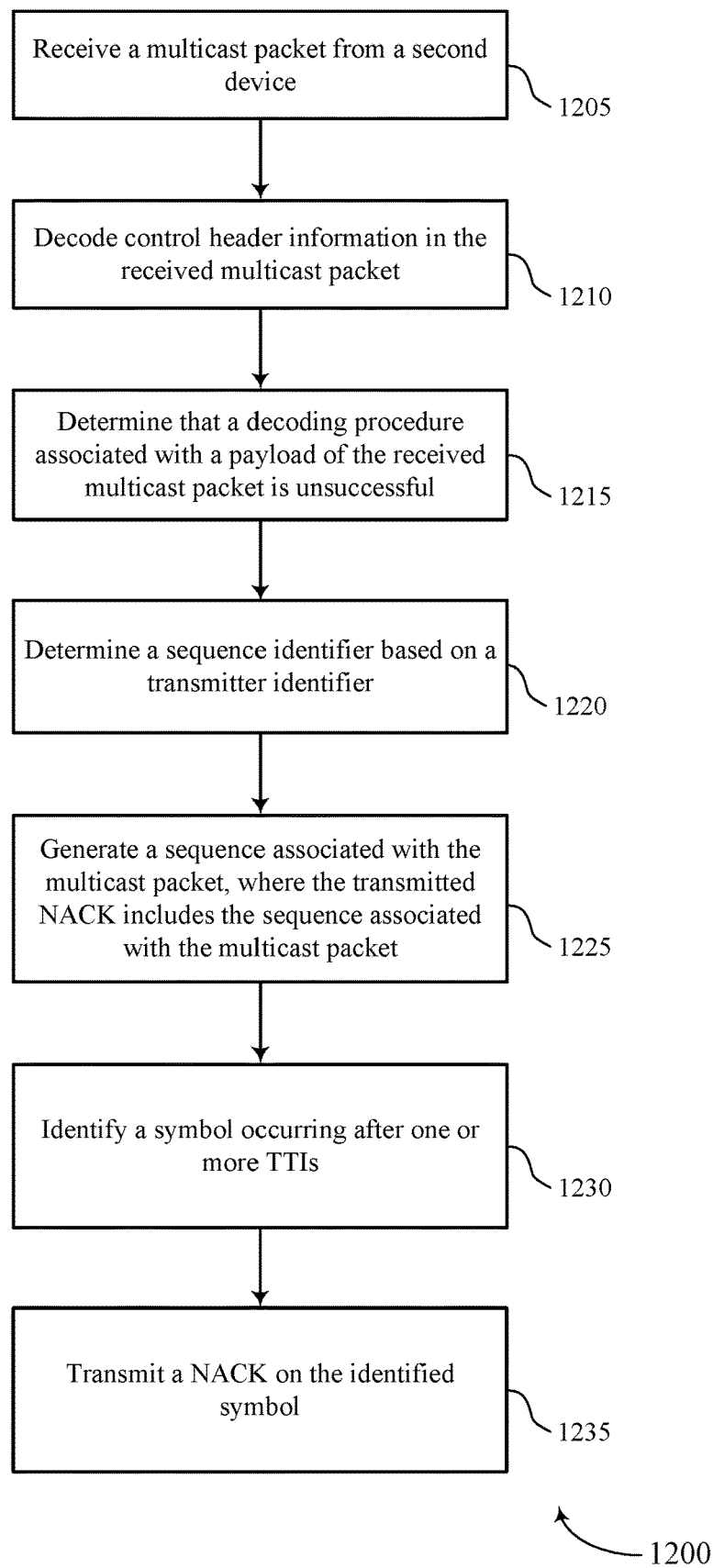

FIG. 12 shows a flowchart illustrating a method 1200 for NR V2X NACK based multicast in accordance with one or more aspects of the present disclosure. The operations of method 1200 may be implemented by a wireless device 605 or its components as described herein. For example, the operations of method 1200 may be performed by a communications manager as described with reference to FIGS. 6 through 9. In some examples, a wireless device 605 may execute a set of codes to control the functional elements of the device to perform the functions described below. Additionally or alternatively, the wireless device 605 may perform aspects of the functions described below using special-purpose hardware.

At block 1205 the wireless device 605 may receive a multicast packet from a second device. The operations of block 1205 may be performed according to the methods described herein. In certain examples, aspects of the operations of block 1205 may be performed by a multicast packet component as described with reference to FIGS. 6 through 9.

At block 1210 the wireless device 605 may decode control header information in the received multicast packet. The operations of block 1210 may be performed according to the methods described herein. In certain examples, aspects of the operations of block 1210 may be performed by a decoding component as described with reference to FIGS. 6 through 9.

At block 1215 the wireless device 605 may determine that a decoding procedure associated with a payload of the received multicast packet is unsuccessful. The operations of block 1215 may be performed according to the methods described herein. In certain examples, aspects of the operations of block 1215 may be performed by a decoding component as described with reference to FIGS. 6 through 9.

At block 1220 the wireless device 605 determine a sequence identifier based on a transmitter identifier. In some cases, generating the sequence associated with the multicast packet is based on the sequence identifier. The operations of block 1220 may be performed according to the methods described herein. In certain examples, aspects of the operations of block 1220 may be performed by a sequence identifier component as described with reference to FIGS. 6 through 9.

At block 1225 the wireless device 605 may generate a sequence associated with the multicast packet. In some examples, the transmitted NACK comprises the sequence associated with the multicast packet. The operations of block 1225 may be performed according to the methods described herein. In certain examples, aspects of the operations of block 1225 may be performed by a sequence component as described with reference to FIGS. 6 through 9.

At block 1230 the wireless device 605 may identify a symbol occurring after one or more TTIs. In some cases, transmitting the NACK occurs on the identified symbol. The operations of block 1230 may be performed according to the methods described herein. In certain examples, aspects of the operations of block 1230 may be performed by a symbol component as described with reference to FIGS. 6 through 9.

At block 1235 the wireless device 605 may transmit a NACK on the identified symbol. The operations of block 1235 may be performed according to the methods described herein. In certain examples, aspects of the operations of block 1235 may be performed by a symbol component as described with reference to FIGS. 6 through 9.

Figure 13:
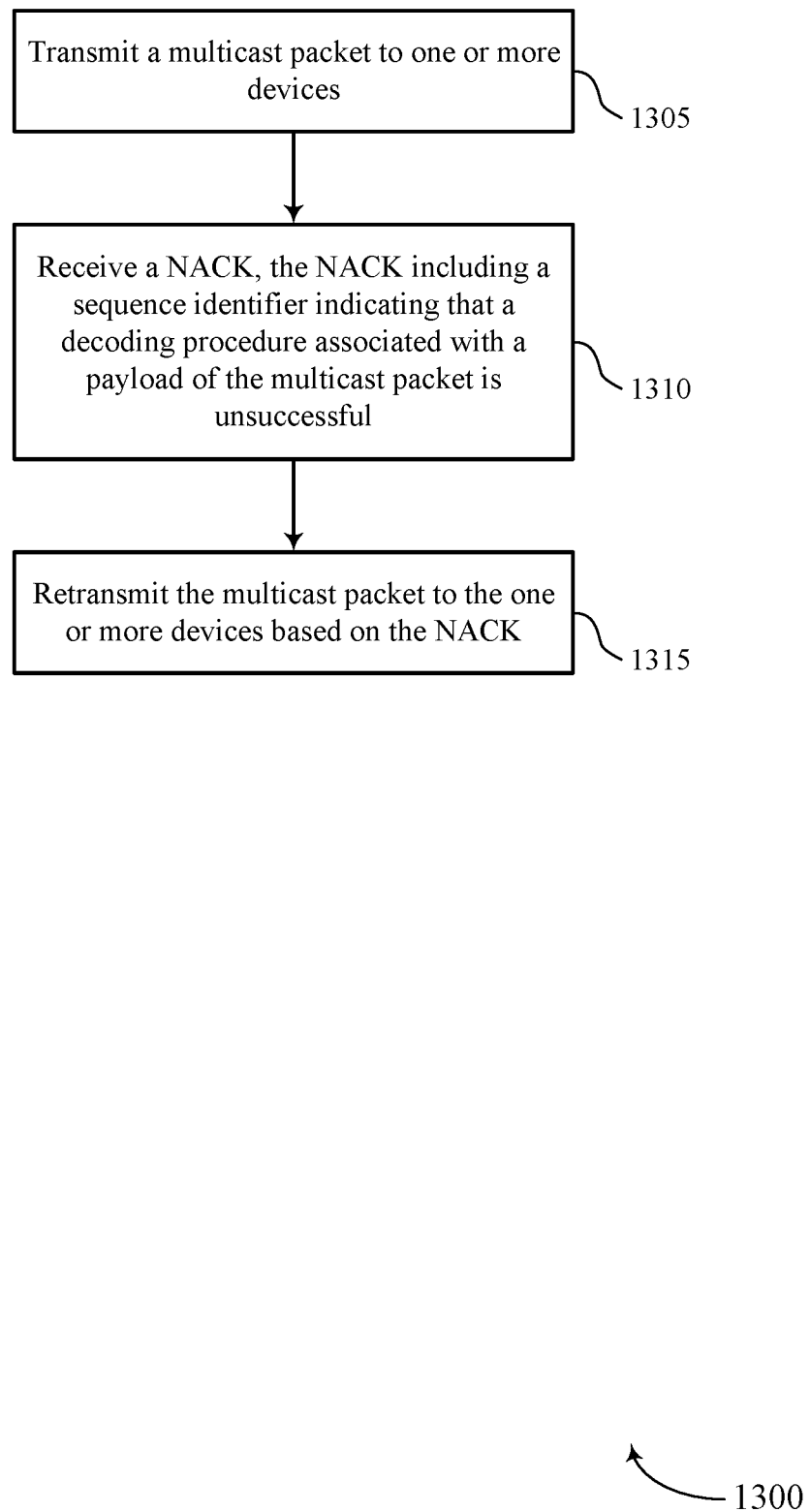

FIG. 13 shows a flowchart illustrating a method 1300 for NR V2X NACK based multicast in accordance with one or more aspects of the present disclosure. The operations of method 1300 may be implemented by a wireless device 605 or its components as described herein. For example, the operations of method 1300 may be performed by a communications manager as described with reference to FIGS. 6 through 9. In some examples, a wireless device 605 may execute a set of codes to control the functional elements of the device to perform the functions described below. Additionally or alternatively, the wireless device 605 may perform aspects of the functions described below using special-purpose hardware.

At block 1305 the wireless device 605 may transmit a multicast packet to one or more devices. The operations of block 1305 may be performed according to the methods described herein. In certain examples, aspects of the operations of block 1305 may be performed by a multicast packet component as described with reference to FIGS. 6 through 9.

At block 1310 the wireless device 605 may receive a NACK, the NACK including a sequence identifier indicating that a decoding procedure associated with a payload of the multicast packet is unsuccessful. The operations of block 1310 may be performed according to the methods described herein. In certain examples, aspects of the operations of block 1310 may be performed by a NACK component as described with reference to FIGS. 6 through 9.

At block 1315 the wireless device 605 may retransmit the multicast packet to the one or more devices based on the NACK. The operations of block 1315 may be performed according to the methods described herein. In certain examples, aspects of the operations of block 1315 may be performed by a retransmitting component as described with reference to FIGS. 6 through 9.

Figure 14:
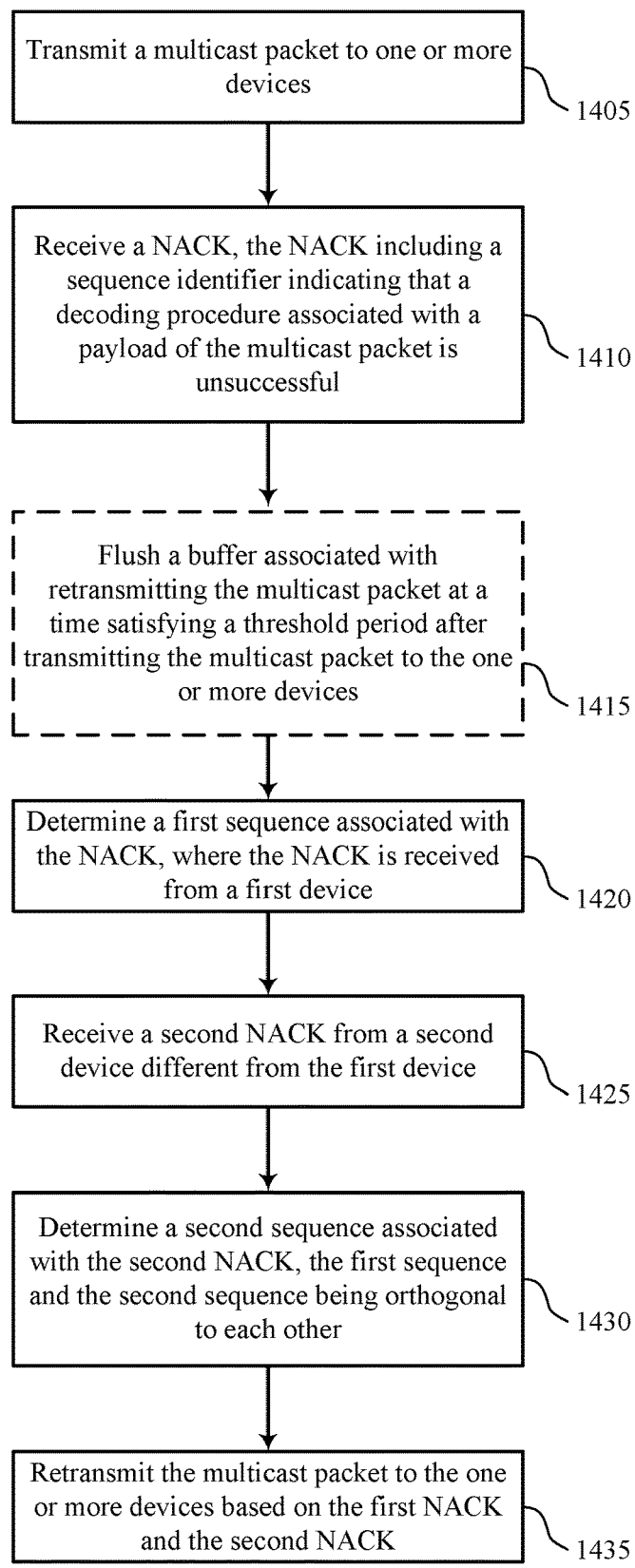

FIG. 14 shows a flowchart illustrating a method 1400 for NR V2X NACK based multicast in accordance with one or more aspects of the present disclosure. The operations of method 1400 may be implemented by a wireless device 605 or its components as described herein. For example, the operations of method 1400 may be performed by a communications manager as described with reference to FIGS. 6 through 9. In some examples, a wireless device 605 may execute a set of codes to control the functional elements of the device to perform the functions described below. Additionally or alternatively, the wireless device 605 may perform aspects of the functions described below using special-purpose hardware.

At block 1405 the wireless device 605 may transmit a multicast packet to one or more devices. The operations of block 1405 may be performed according to the methods described herein. In certain examples, aspects of the operations of block 1405 may be performed by a multicast packet component as described with reference to FIGS. 6 through 9.

At block 1410 the wireless device 605 may receive a NACK, the NACK including a sequence identifier indicating that a decoding procedure associated with a payload of the multicast packet is unsuccessful. The operations of block 1410 may be performed according to the methods described herein. In certain examples, aspects of the operations of block 1410 may be performed by a NACK component as described with reference to FIGS. 6 through 9.

At block 1415 the wireless device 605 may optionally flush a buffer associated with retransmitting the multicast packet at a time satisfying a threshold period after transmitting the multicast packet to the one or more devices. In some cases, the NACK is received after the threshold period. The operations of block 1415 may be performed according to the methods described herein. In certain examples, aspects of the operations of block 1415 may be performed by a buffer component as described with reference to FIGS. 6 through 9.

At block 1420 the wireless device 605 may determine a first sequence associated with the NACK. In some cases, the NACK may be received from a first device. The operations of block 1420 may be performed according to the methods described herein. In certain examples, aspects of the operations of block 1420 may be performed by a sequence component as described with reference to FIGS. 6 through 9.

At block 1425 the wireless device 605 may receive a second NACK from a second device different from the first device. The operations of block 1425 may be performed according to the methods described herein. In certain examples, aspects of the operations of block 1425 may be performed by a NACK component as described with reference to FIGS. 6 through 9.

At block 1430 the wireless device 605 may determine a second sequence associated with the second NACK, the first sequence and the second sequence being orthogonal to each other. In some cases, retransmitting the multicast packet is based on the first sequence and the second sequence. The operations of block 1430 may be performed according to the methods described herein. In certain examples, aspects of the operations of block 1430 may be performed by a sequence component as described with reference to FIGS. 6 through 9.

At block 1435 the wireless device 605 may retransmit the multicast packet to the one or more devices based on the NACK. The operations of block 1435 may be performed according to the methods described herein. In certain examples, aspects of the operations of block 1435 may be performed by a retransmitting component as described with reference to FIGS. 6 through 9.

It should be noted that the methods described above describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
   receiving a multicast packet from a second device;
   decoding control header information in the received multicast packet, the control header information comprising at least a portion of a transmitter identifier associated with the multicast packet;
   determining that a decoding procedure associated with a payload of the received multicast packet is unsuccessful; and
   transmitting a negative acknowledgement (NACK) based at least in part on decoding the control header information and determining that the decoding procedure associated with the payload is unsuccessful.

2. The method of claim 1, further comprising:
   retrieving a list of transmitter identifiers, wherein transmitting the NACK is based at least in part on the list of transmitter identifiers.

3. The method of claim 2, further comprising:
   determining the transmitter identifier associated with the multicast packet based at least in part on the decoded control header information; and
   determining that the transmitter identifier is present in the list of transmitter identifiers, wherein transmitting the NACK is based at least in part on the transmitter identifier being present in the list of transmitter identifiers.

4. The method of claim 2, wherein:
   the list of transmitter identifiers is based at least in part on one or more transmitters located within a determined distance, a type of a sensor information, a combination of one or more types of sensor information, or a combination thereof.

5. The method of claim 1, further comprising:
   generating a sequence associated with the multicast packet, wherein the transmitted NACK comprises the sequence associated with the multicast packet.

6. The method of claim 5, further comprising:
   determining a sequence identifier based at least in part on the transmitter identifier, wherein generating the sequence associated with the multicast packet is based at least in part on the sequence identifier.

7. The method of claim 5, further comprising:
   identifying time and frequency resources associated with transmission of the multicast packet; and
   determining a sequence identifier based at least in part on the time and frequency resources, wherein generating the sequence associated with the multicast packet is based at least in part on the sequence identifier.

8. The method of claim 7, further comprising:
   determining at least one resource block associated with the multicast packet; and identifying an energy level associated with the at least one resource block, wherein identifying the time and frequency resources based at least in part on the energy level.

9. The method of claim 7, wherein:
timing and frequency resources associated with the sequence is same as the time and frequency resources associated with the transmission of the multicast packet.

10. The method of claim 5, wherein:
timing and frequency resources associated with the sequence are derived randomly.

11. The method of claim 5, wherein:
a length of the sequence is based at least in part on a length of a transmission associated with the multicast packet.

12. The method of claim 5, wherein:
a length of the sequence is preconfigured.

13. The method of claim 1, further comprising:
identifying a symbol occurring after one or more transmission time intervals (TTIs), wherein transmitting the NACK occurs on the identified symbol.

14. The method of claim 13, wherein:
the identified symbol is a last symbol of a TTI, wherein transmitting the NACK occurs on the last symbol of the TTI.

15. The method of claim 13, wherein:
the identified symbol is a gap symbol after a determined number of TTIs, wherein transmitting the NACK occurs on the gap symbol after the determined number of TTIs.

16. The method of claim 13, wherein:
the identified symbol is a gap symbol of a TTI within a determined period, wherein transmitting the NACK occurs on the gap symbol of the TTI within the determined period.

17. The method of claim 1, wherein:
the first device, or the second device, or both include a stationary vehicle, a vehicle in motion, a user equipment (UE), a motion sensor, a camera sensor, a light detection and ranging (LIDAR) sensor, a radio detection and ranging (RADAR) sensor, or any combination thereof.

18. A method for wireless communication, comprising:
determining a transmitter identifier associated with a multicast packet;
transmitting the multicast packet comprising control header information and a payload to one or more devices, the control header information comprising at least a portion of the transmitter identifier;
receiving a negative acknowledgement (NACK), the NACK including a sequence identifier indicating that a decoding procedure associated with the payload of the multicast packet is unsuccessful; and
retransmitting the multicast packet to the one or more devices based at least in part on the NACK.

19. The method of claim 18, further comprising:
adding at least the portion of the transmitter identifier to the control header information in the multicast packet before transmitting.

20. The method of claim 19, further comprising:
determining the sequence identifier from the NACK; and
comparing the sequence identifier with the transmitter identifier associated with the multicast packet, wherein retransmitting the multicast packet is based at least in part on the comparing.

21. The method of claim 18, further comprising:
determining time and frequency resources associated with transmission of the multicast packet;
determining the sequence identifier associated with the NACK; and
determining time and frequency resources associated with the sequence identifier, wherein retransmitting the multicast packet is based at least in part on the time and frequency resources associated with the sequence identifier and the time and frequency resources associated with the transmission of the multicast packet.

22. The method of claim 18, further comprising:
determining a first sequence associated with the NACK, wherein the NACK is received from a first device;
receiving a second NACK from a second device different from the first device; and
determining a second sequence associated with the second NACK, the first sequence and the second sequence being orthogonal to each other, wherein retransmitting the multicast packet is based at least in part on the first sequence and the second sequence.

23. The method of claim 22, wherein:
the first device, or the second device, or both include a stationary vehicle, a vehicle in motion, a user equipment (UE), a motion sensor, a camera sensor, a light detection and ranging (LIDAR) sensor, a radio detection and ranging (RADAR) sensor, or any combination thereof.

24. The method of claim 18, further comprising:
flushing a buffer associated with retransmitting the multicast packet at a time satisfying a threshold period after transmitting the multicast packet to the one or more devices, wherein the NACK is received after the threshold period.

25. An apparatus for wireless communication, comprising:
a processor;
memory in electronic communication with the processor; and
instructions stored in the memory and operable, when executed by the processor, to cause the apparatus to:
receive a multicast packet from a second device;
decode control header information in the received multicast packet, the control header information comprising at least a portion of a transmitter identifier associated with the multicast packet;
determine that a decoding procedure associated with a payload of the received multicast packet is unsuccessful; and
transmit a negative acknowledgement (NACK) based at least in part on decoding the control header information and determining that the decoding procedure associated with the payload is unsuccessful.

26. An apparatus for wireless communication, comprising:
a processor;
memory in electronic communication with the processor; and
instructions stored in the memory and operable, when executed by the processor, to cause the apparatus to:
determine a transmitter identifier associated with a multicast packet;
transmit the multicast packet comprising control header information and a payload to one or more devices, the control header information comprising at least a portion of the transmitter identifier;
receive a negative acknowledgement (NACK), the NACK including a sequence identifier indicating that a decoding procedure associated with the payload of the multicast packet is unsuccessful; and
retransmit the multicast packet to the one or more devices based at least in part on the NACK.

27. A non-transitory computer-readable medium storing code for wireless communication at a first device, the code comprising instructions executable by a processor to:
receive a multicast packet from a second device;
decode control header information in the received multicast packet, the control header information comprising at least a portion of a transmitter identifier associated with the multicast packet;
determine that a decoding procedure associated with a payload of the received multicast packet is unsuccessful; and
transmit a negative acknowledgement (NACK) based at least in part on decoding the control header information and determining that the decoding procedure associated with the payload is unsuccessful.

28. The non-transitory computer-readable medium of claim 27, wherein the instructions are further executable by the processor to:
retrieve a list of transmitter identifiers, wherein transmitting the NACK is based at least in part on the list of transmitter identifiers.

29. The non-transitory computer-readable medium of claim 28, wherein the instructions are further executable by the processor to:
determine the transmitter identifier associated with the multicast packet based at least in part on the decoded control header information; and
determine that the transmitter identifier is present in the list of transmitter identifiers, wherein transmitting the NACK is based at least in part on the transmitter identifier being present in the list of transmitter identifiers.

30. The non-transitory computer-readable medium of claim 28, wherein:
the list of transmitter identifiers is based at least in part on one or more transmitters located within a determined distance, a type of a sensor information, a combination of one or more types of sensor information, or a combination thereof.

31. The non-transitory computer-readable medium of claim 27, wherein the instructions are further executable by the processor to:
generate a sequence associated with the multicast packet, wherein the transmitted NACK comprises the sequence associated with the multicast packet.

32. The non-transitory computer-readable medium of claim 31, wherein the instructions are further executable by the processor to:
determine a sequence identifier based at least in part on the transmitter identifier, wherein generating the sequence associated with the multicast packet is based at least in part on the sequence identifier.

33. The non-transitory computer-readable medium of claim 31, wherein the instructions are further executable by the processor to:
identify time and frequency resources associated with transmission of the multicast packet; and
determine a sequence identifier based at least in part on the time and frequency resources, wherein generating the sequence associated with the multicast packet is based at least in part on the sequence identifier.

34. The non-transitory computer-readable medium of claim 33, wherein the instructions are further executable by the processor to:
determine at least one resource block associated with the multicast packet; and
identify an energy level associated with the at least one resource block, wherein identifying the time and frequency resources based at least in part on the energy level.

35. The non-transitory computer-readable medium of claim 33, wherein:
timing and frequency resources associated with the sequence is same as the time and frequency resources associated with the transmission of the multicast packet.

36. The non-transitory computer-readable medium of claim 31, wherein:
timing and frequency resources associated with the sequence are derived randomly.

37. The non-transitory computer-readable medium of claim 31, wherein:
a length of the sequence is based at least in part on a length of a transmission associated with the multicast packet.

38. The non-transitory computer-readable medium of claim 31, wherein:
a length of the sequence is preconfigured.

39. The non-transitory computer-readable medium of claim 27, wherein the instructions are further executable by the processor to:
identify a symbol occurring after one or more transmission time intervals (TTIs), wherein transmitting the NACK occurs on the identified symbol.

40. The non-transitory computer-readable medium of claim 39, wherein:
the identified symbol is a last symbol of a TTI, wherein transmitting the NACK occurs on the last symbol of the TTI.

41. The non-transitory computer-readable medium of claim 39, wherein:
the identified symbol is a gap symbol after a determined number of TTIs, wherein transmitting the NACK occurs on the gap symbol after the determined number of TTIs.

42. The non-transitory computer-readable medium of claim 39, wherein:
the identified symbol is a gap symbol of a TTI within a determined period, wherein transmitting the NACK occurs on the gap symbol of the TTI within the determined period.

43. The non-transitory computer-readable medium of claim 27, wherein:
the first device, or the second device, or both include a stationary vehicle, a vehicle in motion, a user equipment (UE), a motion sensor, a camera sensor, a light detection and ranging (LIDAR) sensor, a radio detection and ranging (RADAR) sensor, or any combination thereof.

44. A non-transitory computer-readable medium storing code for wireless communication, the code comprising instructions executable by a processor to:
determine a transmitter identifier associated with a multicast packet;
transmit the multicast packet comprising control header information and a payload to one or more devices, the control header information comprising at least a portion of the transmitter identifier;

receive a negative acknowledgement (NACK), the NACK including a sequence identifier indicating that a decoding procedure associated with the payload of the multicast packet is unsuccessful; and retransmit the multicast packet to the one or more devices based at least in part on the NACK.

45. The non-transitory computer-readable medium of claim 44, wherein the instructions are further executable by the processor to:

add at least the portion of the transmitter identifier to the control header information in the multicast packet before transmitting.

46. The non-transitory computer-readable medium of claim 45, wherein the instructions are further executable by the processor to:

determine the sequence identifier from the NACK; and
compare the sequence identifier with the transmitter identifier associated with the multicast packet, wherein retransmitting the multicast packet is based at least in part on the comparing.

47. The non-transitory computer-readable medium of claim 44, wherein the instructions are further executable by the processor to:

determine time and frequency resources associated with transmission of the multicast packet;
determine the sequence identifier associated with the NACK; and
determine time and frequency resources associated with the sequence identifier, wherein retransmitting the multicast packet is based at least in part on the time and frequency resources associated with the sequence identifier and the time and frequency resources associated with the transmission of the multicast packet.

48. The non-transitory computer-readable medium of claim 44, wherein the instructions are further executable by the processor to:

determine a first sequence associated with the NACK, wherein the NACK is received from a first device;
receive a second NACK from a second device different from the first device; and
determine a second sequence associated with the second NACK, the first sequence and the second sequence being orthogonal to each other, wherein retransmitting the multicast packet is based at least in part on the first sequence and the second sequence.

49. The non-transitory computer-readable medium of claim 48, wherein:

the first device, or the second device, or both include a stationary vehicle, a vehicle in motion, a user equipment (UE), a motion sensor, a camera sensor, a light detection and ranging (LIDAR) sensor, a radio detection and ranging (RADAR) sensor, or any combination thereof.

50. The non-transitory computer-readable medium of claim 44, wherein the instructions are further executable by the processor to:

flush a buffer associated with retransmitting the multicast packet at a time satisfying a threshold period after transmitting the multicast packet to the one or more devices, wherein the NACK is received after the threshold period.

51. An apparatus for wireless communication, comprising:

means for receiving a multicast packet from a second device;
means for decoding control header information in the received multicast packet, the control header information comprising at least a portion of a transmitter identifier associated with the multicast packet;
means for determining that a decoding procedure associated with a payload of the received multicast packet is unsuccessful; and
means for transmitting a negative acknowledgement (NACK) based at least in part on decoding the control header information and determining that the decoding procedure associated with the payload is unsuccessful.

52. An apparatus for wireless communication, comprising:

means for determining a transmitter identifier associated with a multicast packet;
means for transmitting the multicast packet comprising control header information and a payload to one or more devices, the control header information comprising at least a portion of the transmitter identifier;
means for receiving a negative acknowledgement (NACK), the NACK including a sequence identifier indicating that a decoding procedure associated with the payload of the multicast packet is unsuccessful; and
means for retransmitting the multicast packet to the one or more devices based at least in part on the NACK.

* * * * *